US006717096B2

(12) United States Patent
Hewett et al.

(10) Patent No.: US 6,717,096 B2
(45) Date of Patent: Apr. 6, 2004

(54) DUAL MODE PLASMA ARC TORCH

(75) Inventors: Roger W. Hewett, Plainfield, NH (US); Kevin D. Horner-Richardson, Cornish, NH (US); Joseph P. Jones, Lebanon, NH (US); Shiyu Chen, Claremont, NH (US); Fred Rogers, Enfield Center, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 106 days.

(21) Appl. No.: 10/083,029

(22) Filed: Feb. 26, 2002

(65) Prior Publication Data

US 2002/0117482 A1 Aug. 29, 2002

Related U.S. Application Data

(63) Continuation-in-part of application No. 09/794,540, filed on Feb. 27, 2001.

(51) Int. Cl.[7] ........................................ B23K 10/00

(52) U.S. Cl. ............... 219/121.48; 219/75; 219/121.57; 219/121.5; 219/121.52

(58) Field of Search ....................... 219/121.54, 121.57, 219/121.39, 121.5, 121.51, 121.52, 74, 75, 121.59, 121.48

(56) References Cited

U.S. PATENT DOCUMENTS

| | | | | |
|---|---|---|---|---|
| 4,682,005 A | | 7/1987 | Marhic | |
| 4,902,871 A | | 2/1990 | Sanders et al. | |
| 5,760,363 A | * | 6/1998 | Hackett et al. | 219/121.44 |
| 5,844,197 A | * | 12/1998 | Daniel | 219/121.57 |
| 5,897,795 A | | 4/1999 | Lu et al. | |
| 5,961,855 A | * | 10/1999 | Hewett et al. | 219/121.39 |
| 5,990,443 A | | 11/1999 | Tatham et al. | |
| 5,994,663 A | | 11/1999 | Lu | |
| 6,163,008 A | | 12/2000 | Roberts et al. | |

* cited by examiner

*Primary Examiner*—Mark Paschall
(74) *Attorney, Agent, or Firm*—Harness, Dickey & Pierce, P.L.C.

(57) ABSTRACT

A dual mode plasma arc torch is provided that preferably comprises a start cartridge disposed between an electrode and a tip. In one form, the start cartridge comprises an initiator that is in electrical contact with the electrode and that is resiliently biased into contact with the tip, such that when the plasma arc torch is in a contact start mode, the initiator is movable against the resilient bias to separate from the tip and establish a pilot arc between the initiator and the tip. Further, when the plasma arc torch is in a high frequency start mode, the start cartridge spaces the tip from the electrode such that a pilot arc is established between the electrode and the tip. In other forms, a contact start torch is provided that is operable under high frequency, and conversely, a high frequency start torch is provided that is operable under low voltage.

58 Claims, 16 Drawing Sheets

DUAL MODE PLASMA ARC TORCH

CROSS-REFERENCE TO RELATED APPLICATIONS

The present application is a continuation in part of U.S. application Ser. No. 09/794,540, titled "Contact Start Plasma Torch," filed Feb. 27, 2001 now pending.

FIELD OF THE INVENTION

The present invention relates generally to plasma arc torches and more particularly to devices and methods for initiating a pilot arc in a plasma arc torch.

BACKGROUND OF THE INVENTION

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip has a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Ionized gas is then blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

One of two methods is typically used for initiating the pilot arc between the electrode and the tip. In the first method, commonly referred to as a "high frequency" or "high voltage" start, a high potential is applied across the electrode and the tip sufficient to create an arc in the gap between the electrode and the tip. Accordingly, the first method is also referred to as a "non-contact" start, since the electrode and the tip do not make physical contact to generate the pilot arc. In the second method, commonly referred to as a "contact start," the electrode and the tip are brought into contact and are gradually separated, thereby drawing an arc between the electrode and the tip. The contact start method thus allows an arc to be initiated at much lower potentials since the distance between the electrode and the tip is much smaller.

Plasma arc torches, including the consumable components, e.g., electrode, tip, are designed for either a contact start or a high frequency start mode. Accordingly at least one plasma arc torch and a specific set of consumables are used with a high frequency power supply, and at least one additional plasma arc torch and an additional set of consumables are used with a low voltage (contact start) power supply. As a result, for an operator that uses both high frequency and low voltage power supplies, a plurality of plasma arc torches and corresponding consumables must be purchased and maintained in inventory for continuous operations.

Accordingly, a need remains in the art to reduce the number of torches, parts, and consumables required for operation with a high frequency and a low voltage power supply. A further need exists to increase the efficiency of working with both a high frequency and a low voltage power supply.

SUMMARY OF THE INVENTION

The present invention provides a plasma arc torch that is operable with either a high frequency or a low voltage power supply, such that the torch is capable of a high frequency start or a contact start, thereby resulting in a dual mode torch. Additionally, another dual mode torch is provided that comprises a conventional contact start torch modified for operation with a high frequency power supply. Yet another dual mode torch is provided that comprises a conventional high frequency start torch modified for operation with a low voltage power supply.

In one preferred form, the present invention provides a dual mode plasma arc torch that comprises an electrode, a tip, and a start cartridge disposed between the electrode and the tip, wherein the start cartridge comprises an initiator in electrical contact with the electrode and in contact with the tip. Accordingly, when the plasma arc torch is in a contact start mode, the initiator is movable to separate from the tip and establish a pilot arc between the initiator and the tip, and when the plasma arc torch is in a high frequency start mode, the start cartridge spaces the tip from the electrode such that a pilot arc is established between the electrode and the tip.

In another form, a plasma arc torch is provided that comprises an electrode, a tip, and at least one of a contact start cartridge for a contact start mode and a high frequency start cartridge for a high frequency start mode. When the plasma arc torch is in a contact start mode, the initiator is movable to separate from the tip and establish a pilot arc between the initiator and the tip, and when the plasma arc torch is in a high frequency start mode, the high frequency start cartridge spaces the tip from the electrode such that a pilot arc is established between the electrode and the tip. Preferably, the high frequency start cartridge comprises a plurality of vent holes that provide gas flow to cool the electrode, which are offset from a center of the high frequency start cartridge in order to provide a swirling flow and further cooling capability.

In yet another form, a conventional contact start plasma arc torch is modified to comprise additional dielectric standoff, which is sized such that the contact start plasma arc torch may be operated under high frequency. Additionally, a conventional high frequency plasma arc torch is modified to comprise a movable element, e.g., electrode, tip, or third element, such that the high frequency plasma arc torch is operable under low voltage, thereby resulting in dual mode torches, i.e. torches capable of operating with either a high frequency or a low voltage power supply. Additionally, methods of operating the dual mode plasma arc torches are provided in accordance with the teachings of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
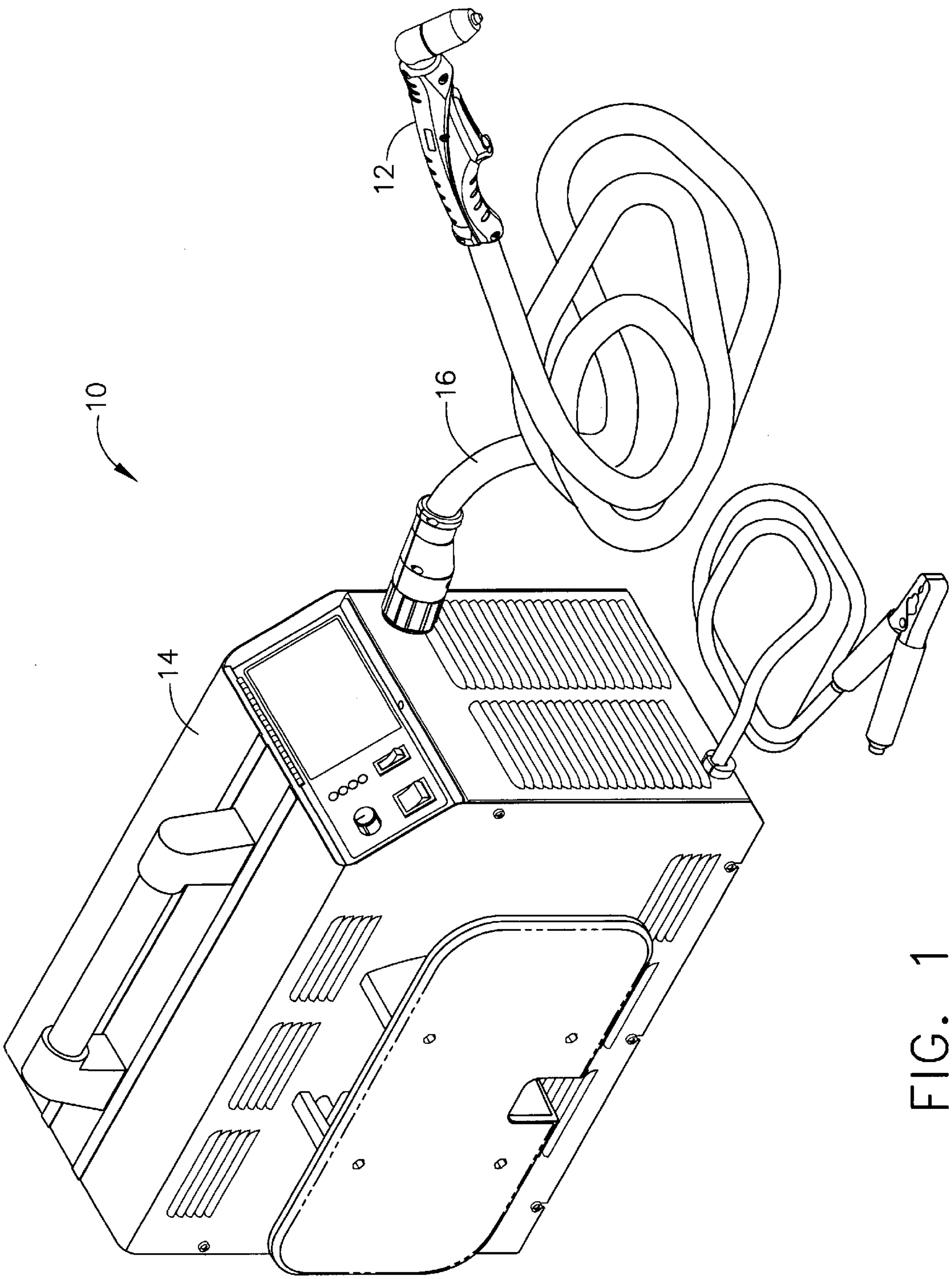
FIG. 1 is a perspective view of a manually operated plasma arc apparatus in accordance with the principles of the present invention.

Referring to the drawings, a dual mode torch according to the present invention is generally operable with a manually operated plasma arc apparatus as indicated by reference numeral 10 in FIG. 1. Typically, the manually operated plasma arc apparatus 10 comprises a plasma arc torch 12 connected to a power supply 14 through a torch lead 16, which may be available in a variety of lengths according to a specific application. Further, the power supply 14 provides both gas and electric power, which flow through the torch lead 16, for operation of the plasma arc torch 12.

As used herein, a plasma arc apparatus, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, the terms "biased" or "biasing" should not be construed as meaning an electrical bias or voltage as often used in the electrical field.

Generally, three (3) preferred dual mode torch configurations are disclosed in accordance with the teachings of the present invention, wherein the term "dual mode" refers to the ability of a single plasma arc torch to operate in both a high frequency start mode and a contact start mode. The first preferred dual mode torch comprises a start cartridge that is disposed between an electrode and a tip, in which one or more start cartridges may be interchanged to operate the plasma arc torch in either a high frequency start mode or a contact start mode. The second preferred dual mode torch is generally one among a plurality of conventional contact start torches with a provision of additional voltage isolation, or dielectric standoff, between an anode body and a cathode body. The third preferred dual mode torch configuration is generally one among a plurality of high frequency start torches with a provision of a moving electrode, tip, and/or third element as described in greater detail below.

Dual Mode Torch with Start Cartridge

Figure 2:
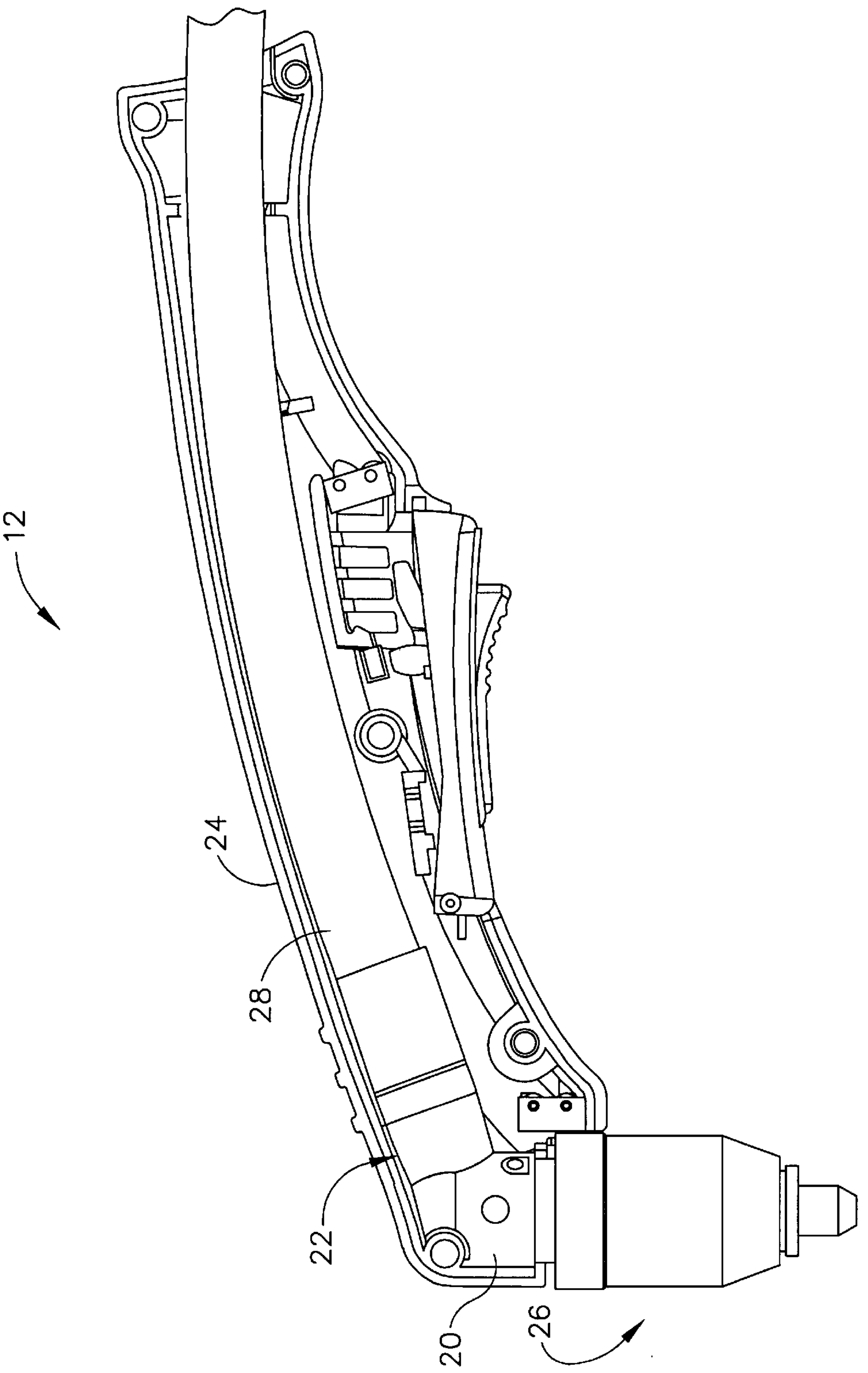
FIG. 2 is a side view of a torch head disposed within a plasma arc torch and constructed in accordance with the principles of the present invention.

Referring now to FIG. 2, a torch head for use in the contact start plasma arc torch 12 of the present invention is illustrated and generally indicated by reference numeral 20. As shown, the torch head 20 defines a proximal end 22 that is disposed within a handle 24 (one half of which is removed to show the details of construction) of the plasma arc torch 12 and a distal end 26, to which a plurality of consumable components are secured, as described in greater detail below. The proximal end 22 is also adapted for connection to a torch lead 28, which provides both gas and electric power for operation of the contact start plasma arc torch 12. The connection to the torch lead 28 may comprise a quick disconnect such as that disclosed in co-pending application titled "Modular Plasma Arc Torch," filed on Feb. 26, 2002, and commonly assigned with the present application, the contents of which are incorporated herein by reference. Further, as described herein, proximal direction or proximally is the direction towards the proximal end 22, and distal direction or distally is the direction towards the distal end 26.

Figure 3:
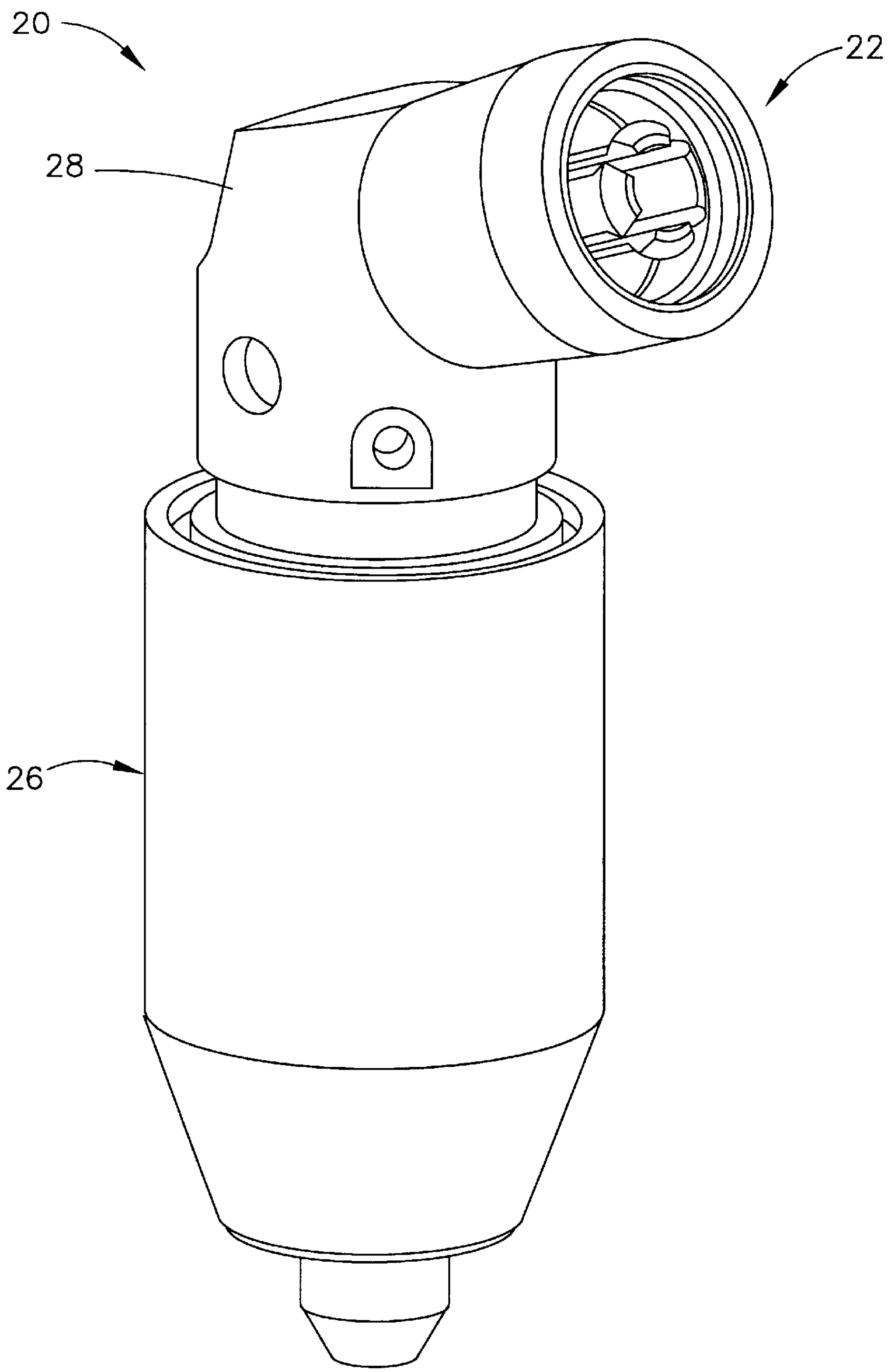
FIG. 3 is a perspective view of a torch head constructed in accordance with the principles of the present invention.
Figure 4:
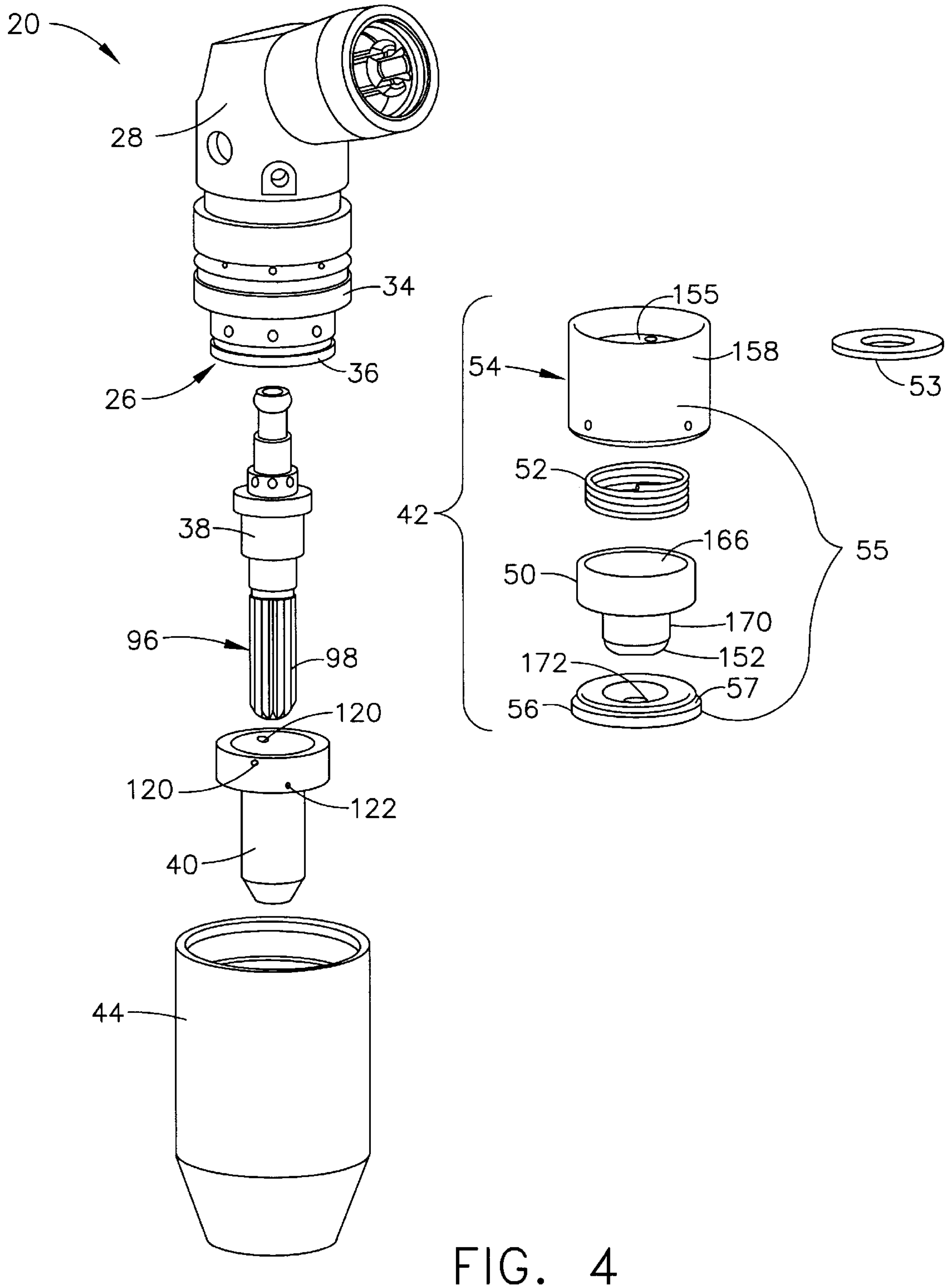
FIG. 4 is an exploded perspective view of a torch head and consumable components constructed in accordance with the principles of the present invention.
Figure 5:
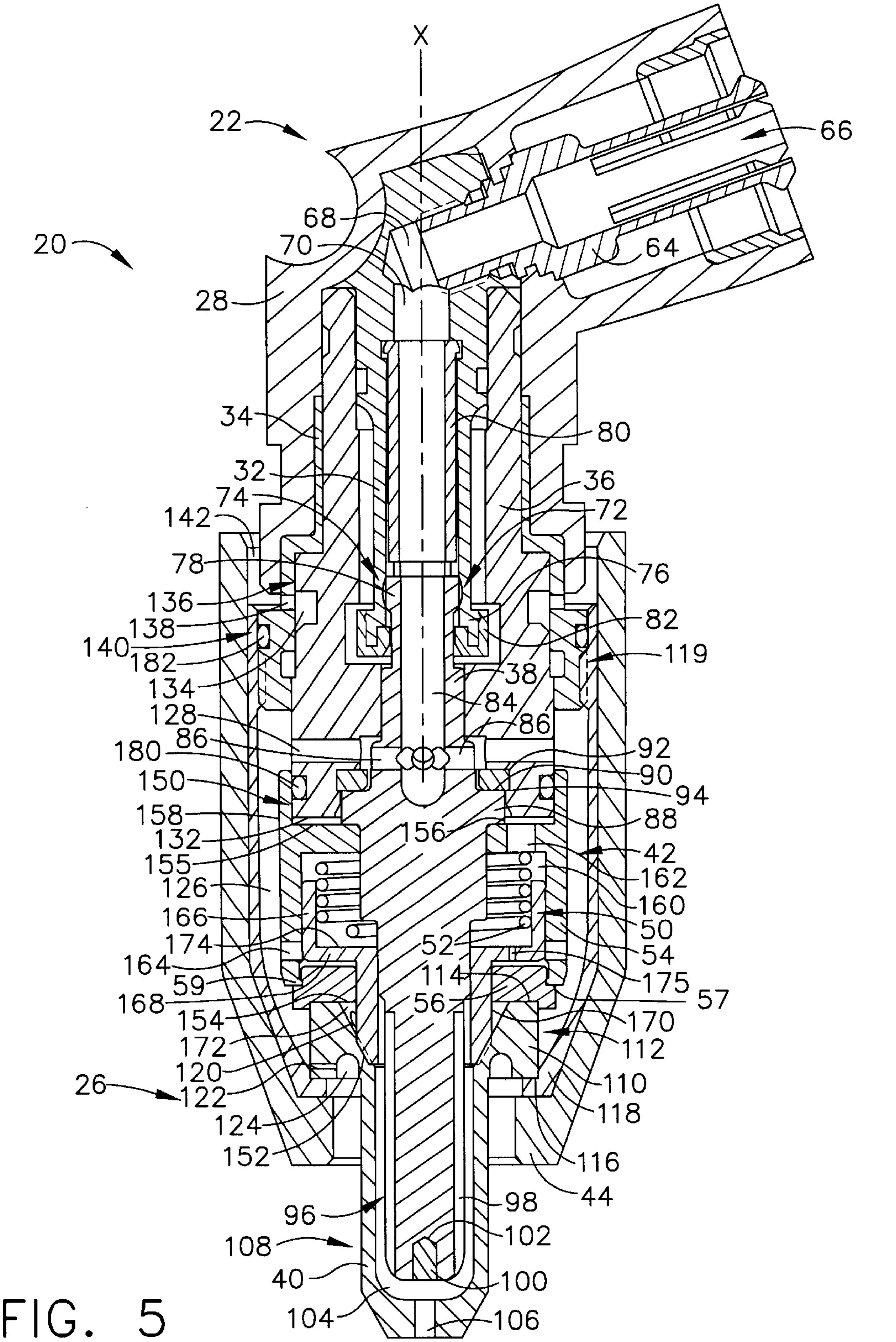
FIG. 5 is a cross-sectional view of a torch head and consumable components constructed in accordance with the principles of the present invention.

With reference to FIGS. 3 through 5, the torch head 20 further comprises a housing 28 in which fixed components of the torch head 20 are disposed. More specifically, the fixed components comprise a cathode 32 (FIG. 5) that has relatively negative potential, an anode 34 that has relatively positive potential, and an insulating body 36 that insulates the cathode 32 from the anode 34 The consumable components are generally secured to the distal end 26 of the torch head 20 and comprise an electrode 38, a tip 40, a start cartridge 42 that is used to draw a pilot arc as described below, and a shield cup 44 that secures the consumable components to the distal end 26 of the torch head 20 and further insulates the consumable components from the surrounding area during operation of the torch. The shield cup 44 also positions and orients the consumable components, e.g., the start cartridge 42 and the tip 40, relative to one another for proper operation of the torch when the shield cup 44 is fully engaged with the torch head 20.

As further shown, the start cartridge 42, also referred to as a contact start cartridge 42, comprises an initiator 50 and a coil spring 52 housed within a cartridge body 54 and a tip seat 56. Accordingly, the start cartridge 42 is preferably a single replaceable consumable component. Additionally, the start cartridge 42 as shown is preferably employed with a contact start plasma arc torch, however, the start cartridge 42 may also be employed with a high frequency start plasma arc torch such that a single start cartridge is used for both high frequency and contact start modes. However, additional configurations for the start cartridge 42 specific to a high frequency start plasma arc torch are described in greater detail below.

The cartridge body 54 and the tip seat 56 together are referred to as a cartridge assembly 55. In one form of the cartridge assembly 55, the cartridge body 54 is conductive while the tip seat 56 is insulative. In another form of the cartridge assembly 55, the cartridge body 54 is insulative, the tip seat 56 is insulative, and the cartridge assembly further comprises a conductive member 53, which may be a washer as shown, disposed at a proximal end of the cartridge body 54. The function and operation of the start cartridge 42, its components, and the fixed and other consumable components of the torch head 20 are described in greater detail below.

As shown in FIG. 5, the torch head 20 is illustrated with the cathode 32 secured within the housing 28, and the electrode 38 electrically connected to the cathode 32. The generally cylindrical insulating body 36 surrounds the cathode and insulates the cathode 32 from the anode 34. As further shown, the cathode 32 abuts and electrically connects with a pin fitting 64 that is adapted for connection to the torch lead 28 (not shown). Accordingly, the cathode 32 is electrically connected to the negative side of the power supply 14 (not shown), and the anode 34 is in electrical communication with the positive side of the power supply. Further, the pin fitting 64 defines an internal bore 66 and the cathode 32 defines a central bore 70, which are in fluid communication for the supply of a working gas from the power supply 14 to the torch head 20. Although the cathode 32 and the pin fitting 64 are illustrated as being oriented at an angle relative to one another, the cathode 32 and the pin fitting 64 (or another adjacent component connected to the cathode 32) may alternately be colinear, or oriented 180 degrees relative to one another as commonly referred to in the art.

The electrode 38 defines an upper connecting end 72 for connecting the electrode 38 with a connecting end 74 of the cathode 32. The connecting ends 72, 74 of the electrode 38 and the cathode 32 are configured for coaxial telescoping connection with one another as shown and described in co-owned U.S. Pat. No. 6,163,008, which is incorporated herein by reference. To establish the connection between the cathode 32 and the electrode 38, the cathode connecting end 74 and the electrode connecting end 72 are formed with opposing detents generally designated 76 and 78, respectively. The detents 76 and 78 are interengageable with one another when the connecting end 74 of the electrode 38 is connected to the cathode 32 to inhibit axial movement of the electrode 38 away from the cathode 32. However, it should be understood that the electrode 38 may be connected to the cathode 32 in other conventional manners, such as by a threaded connection, without departing from the scope of the present invention.

Additionally, an insulating body 80 is disposed in the proximal end of the cathode 32, and an insulating cap 82 is mounted on the distal end of the cathode 32, which results in a relatively small area within the cathode central bore 70 exposed for contacting the electrode 38. Both the insulating body 80 and the insulating cap 82 are configured and positioned to inhibit electrical contact between an object other than the electrode 38 with the cathode 32 to reduce the risk of torch malfunction should such an object be inserted into the cathode central bore 70.

The electrode 38 defines a central bore 84 that extends distally from the connecting end 72 and is in fluid communication with the central bore 70 of the cathode 32 such that the working gas in the cathode central bore 70 is directed down through the central bore 84 of the electrode 38. The central bore 84 of the electrode 38 extends distally from the connecting end 72 into registry with gas distributing holes 86 that extend radially outward from the central bore 84 for exhausting working gas from the electrode 38. The electrode 38 further comprises an annular collar 88 that extends radially outward as shown and defines a proximal shoulder 90 below the gas distributing holes 86. The proximal shoulder 90 abuts a bushing 92 that is seated within an annular groove 94 formed in the insulating body 36. The bushing 92 is a durable material, preferably a polyimide such as Vespel®, so that the torch head 20 can withstand repeated installation of an electrode 38 without causing damage to the insulating body 36, which is more costly and difficult to replace. Further, a distal portion 96 of the electrode 38 defines a generally elongated, cylindrical shape with a fluted surface formed by longitudinally extending ridges 98. The electrode 38 of the illustrated embodiment is constructed of copper or a copper alloy and preferably comprises an emissive insert 100 secured within a recess 102 at the distal end of the electrode 38.

The generally hollow tip 40, also commonly referred to as a nozzle, is mounted over the distal portion 96 of the electrode 38. The tip 40 is in a radially and longitudinally spaced relationship with the electrode 38 to form a primary gas passage 104, which is also referred to as an arc chamber or plasma chamber. A central exit orifice 106 of the tip 40 communicates with the primary gas passage 104 for exhausting ionized gas in the form of a plasma stream from the tip 40 and directing the plasma stream down against a workpiece. The tip 40 further comprises a hollow, generally cylindrical distal portion 108 and an annular flange 110 at a proximal end 112. The annular flange 110 defines a generally flat, proximal face 114 that seats against and seals with the tip seat 56 of the start cartridge 42, and a distal face 116 adapted to seat within and make electrical contact with a conductive insert 118 disposed within the shield cup 44. The conductive insert 118 is further adapted for connection with the anode 34, preferably using a threaded connection 119 such that electrical continuity between the positive side of the power supply is maintained. Accordingly, the tip 40 is in electrical contact with the positive, or anode, side of the power supply through the conductive insert 118.

The tip 40 further defines a plurality of swirl holes 120 (further shown in FIG. 4) offset from a center of the tip 40 and positioned around and through the annular flange 110. Additionally, the tip 40 preferably defines a plurality of secondary gas holes 122 (also shown in FIG. 4) extending radially through the annular flange 110 and into an annular recess 124 on the distal face 116. Accordingly, the tip 40 regulates the plasma gas to form a plasma stream in addition to the secondary gas to stabilize the plasma stream, which is further shown and described in co-pending application titled "Tip Gas Distributor," filed on Feb. 26, 2002, and commonly assigned with the present application, the contents of which are incorporated herein by reference. Further, the tip 40 is preferably made of a copper or copper alloy material.

The shield cup 44 surrounds the distal end 26 of the torch head 20 and generally secures and positions the consumable components therein, in addition to insulating an area surrounding the torch head 20 from the conductive components during operation and while the power supply 14 (not shown) supplies electric power to the torch head 20. When secured to the torch head 20 through the threaded connection 119, a primary gas chamber 126 is formed between the conductive insert 118 of the shield cup 44 and the insulating body 36, the start cartridge 42, and the tip 40, through which the primary working gas flows during operation of the torch as described in greater detail below. Additionally, the shield cup 44 is preferably made of a non-conductive, heat insulating material, such as a phenolic or ceramic.

Figure 6:
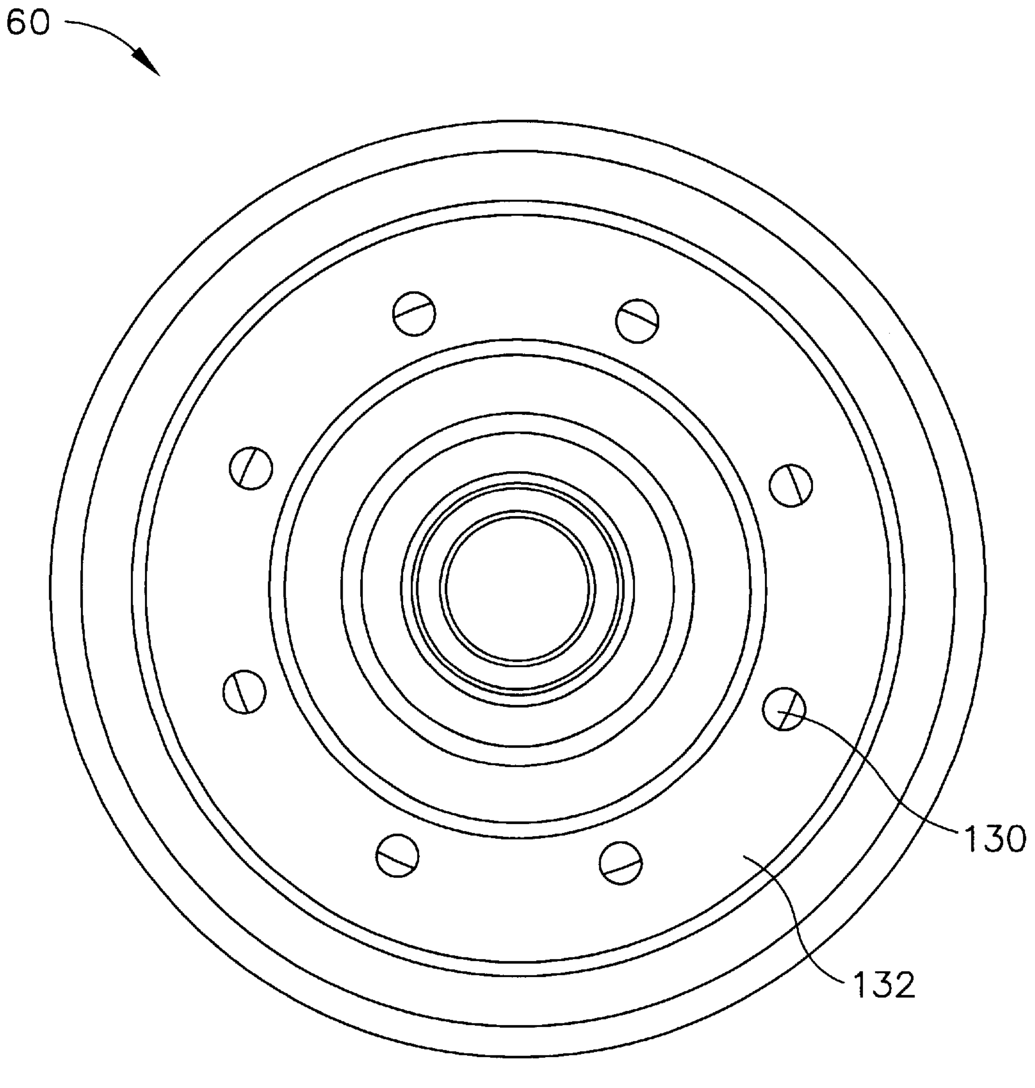
FIG. 6 is a plan view of a distal end of a torch head constructed in accordance with the principles of the present invention.

The insulating body 36 further defines a plurality of radial gas distributing holes 128 that are in fluid communication with the electrode gas distributing holes 86 and also with the primary gas chamber 126. Referring also to FIG. 6, the insulating body 36 further defines a plurality of axial vent holes 130 extending through a distal face 132, which are in fluid communication with a set of radial vent holes 134 defined in a proximal section 136 of the insulating body 36. The radial vent holes 134 are in further fluid communication with a set of radial vent holes 138 defined in a distal section 140 of the anode member 34, which are in fluid communication with an opening 142 near the proximal end of the shield cup 44, formed between the shield cup 44 and the torch head housing 28, which is exposed to atmosphere as shown. Accordingly, gas is vented through the series of vent holes in the insulating body 36, the anode 34, and the shield cup 44 during operation of the torch is described in greater detail below. Further, the insulating body 36 is preferably made of a non-conductive, heat insulating material, such as phenolic or ceramic, and the anode member 34 is made of a conductive material such as brass or a brass alloy.

Figure 7B:
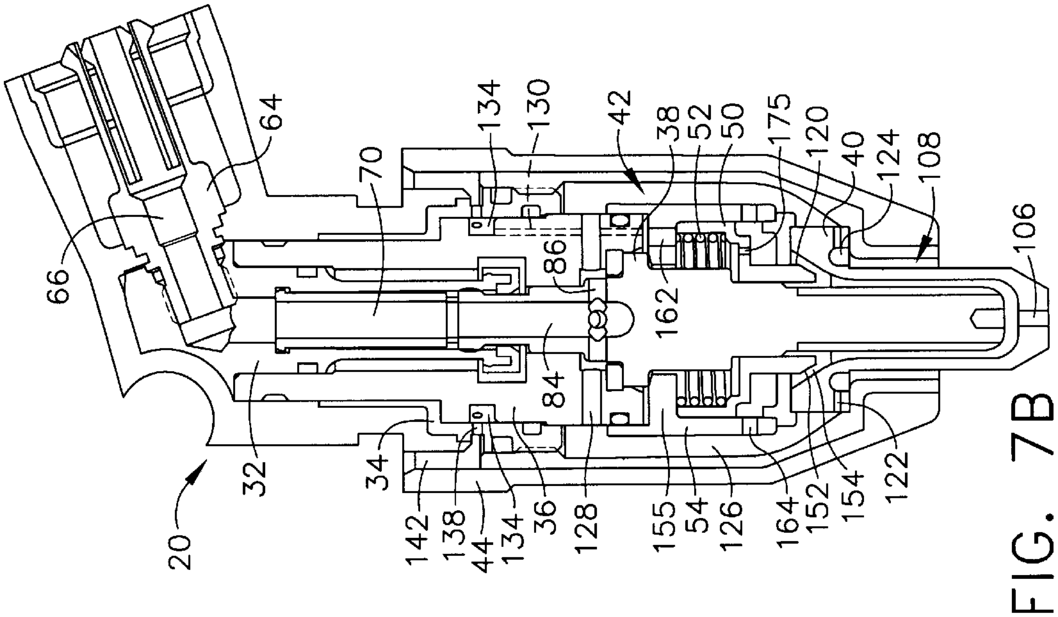
FIG. 7B is a cross-sectional view of a torch head in a pilot mode and constructed in accordance with the principles of the present invention.
Figure 7A:
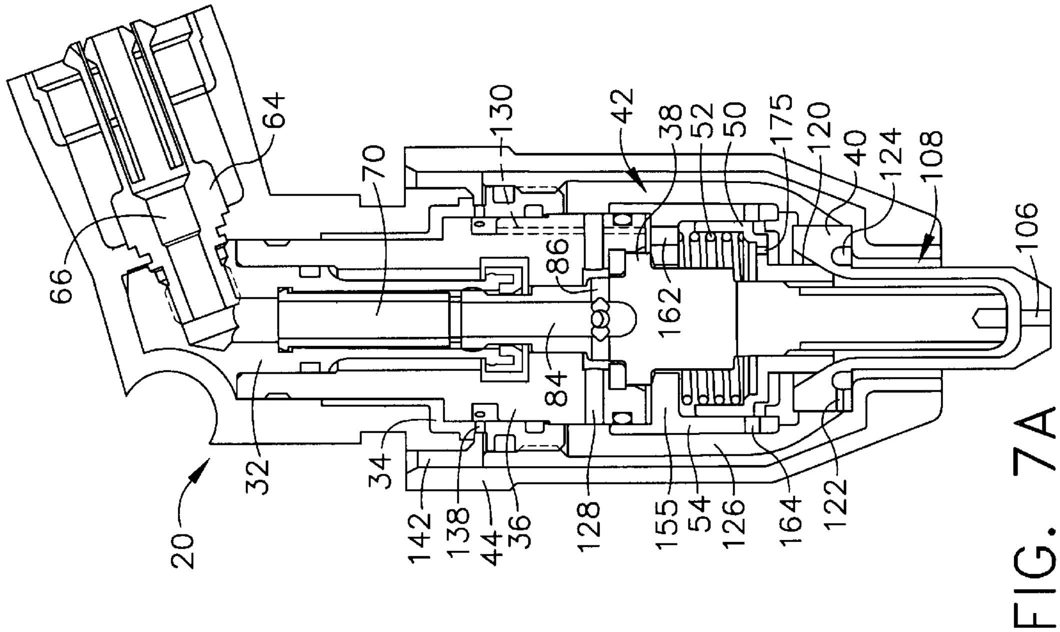
FIG. 7A is a cross-sectional view of a torch head in an idle mode and constructed in accordance with the principles of the present invention.
Figure 8:
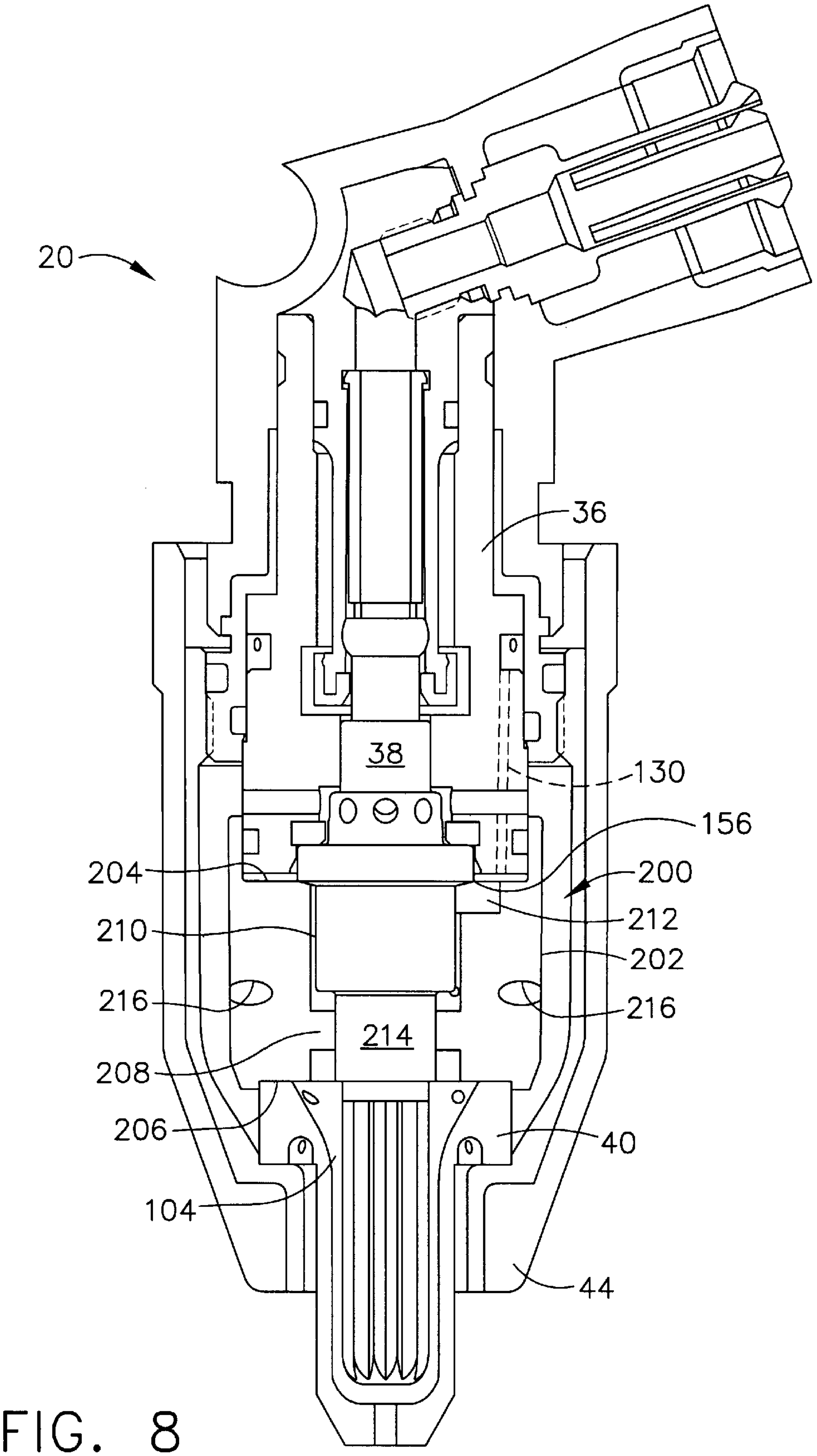
FIG. 8 is a cross-sectional view of a torch head comprising a start cartridge for a high frequency start mode and constructed in accordance with the principles of the present invention.
Figure 9:
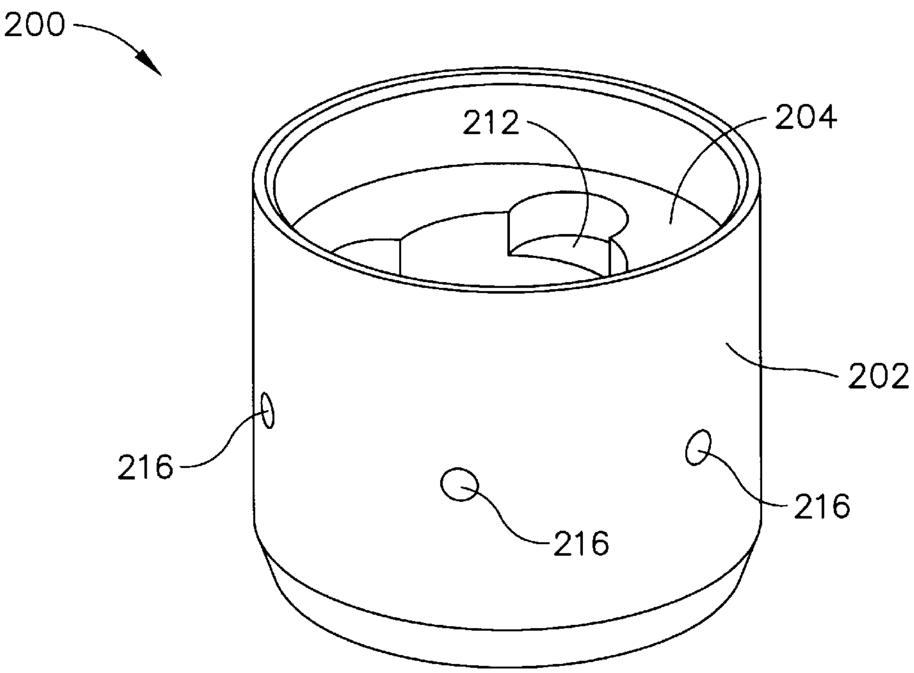
FIG. 9 is an upper perspective view of a high frequency start cartridge constructed in accordance with the principles of the present invention.
Figure 10:
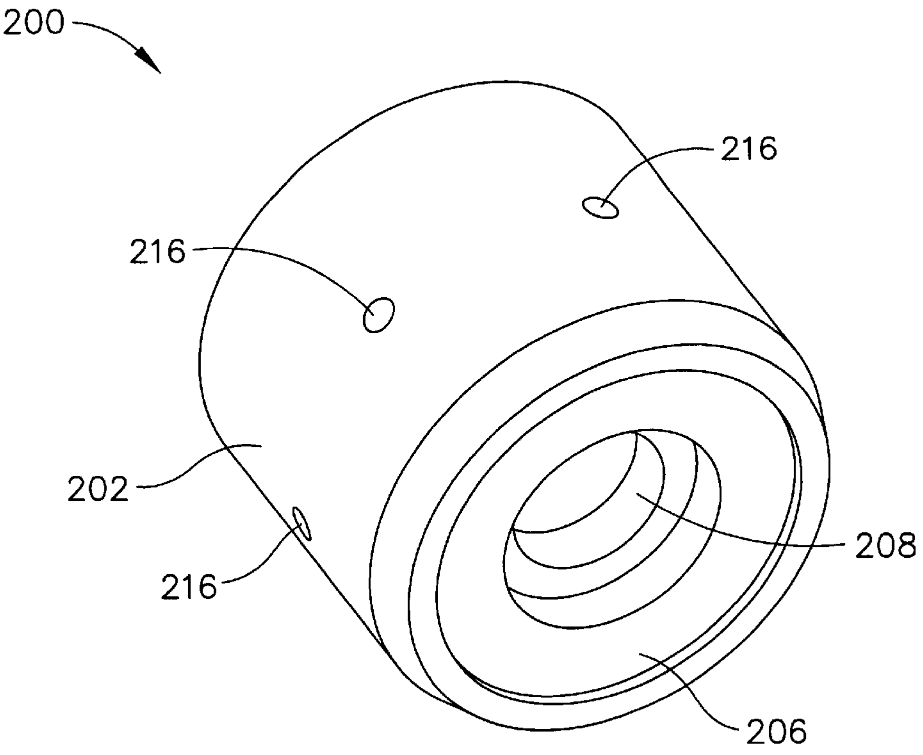
FIG. 10 is a lower perspective view of the high frequency start cartridge in accordance with the principles of the present invention.

Referring to FIGS. 7A and 7B, the start cartridge 42 in accordance with the principles of the present invention is operable between an idle mode (FIG. 7A) and a pilot mode (FIG. 7B) of the torch. In the idle mode, the initiator 50 is in electrical contact with the electrode 38 and is resiliently biased into contact with the tip 40. The initiator 50 preferably defines a beveled distal contact surface 152 that is in contact with a conical interior surface 154 of the tip 40. Further, the initiator 50 is resiliently biased into contact with the tip 40 with any suitable biasing member or means, such as a spring, or an elastic or elastomeric member, among others. In the preferred embodiment as shown, the biasing member is the coil spring 52, which is sufficiently stiff that gas pressure from the gas supply overcomes the spring force to separate the initiator 50 from the tip 40. Further, the initiator 50 and the coil spring 52, along with the cartridge body 54 and the tip seat 56, are preferably part of a replaceable start cartridge 42. Accordingly, the tip seat 56 defines an annular shoulder 57 that engages an annular flange 59 of the cartridge body 54, wherein the connection between the annular shoulder 57 and the annular flange 59 may be press fit or adhesively bonded, among other methods commonly known in the art.

As further shown, the cartridge body 54 comprises a recessed end wall 155 that abuts a distal shoulder 156 of the electrode 38, and a generally cylindrical sidewall 158. When fully assembled, a chamber 160 is defined within the start cartridge 42, in which the coil spring 52 and a portion of the initiator 50 are disposed. The cartridge body 54 further defines axial vent holes 162 that extend through the recessed end wall 155 and that are in fluid communication with the chamber 160 and with the axial vent holes 130 in the distal face 132 of the insulating body 36 as previously described. Additionally, a series of radial gas holes 164 are disposed around the sidewall 158, which direct a portion of the working gas into the start cartridge 42 to overcome the bias of coil spring 52 to move the initiator 50 away from the tip 40 and against the bias of the coil spring 52 as described in greater detail below.

The initiator 50 defines a generally cylindrical portion 166, an annular flange 168, and a tubular portion 170 that defines the beveled contact surface 152. As shown, the proximal section of the tubular portion 170 is in electrical contact with the electrode 38, and the distal section of the tubular portion 170 projects distally through a central aperture 172 in the tip seat 56. Further, the coil spring 52 is disposed within the cylindrical portion 166 and is seated against a proximal face 174 of the initiator. The proximal face 174 further defines axial vent holes 175, which are in fluid communication with the chamber 60 and also with the cartridge body axial vent holes 162, such that the gas in the chamber is vented from the torch head 20 as further described below. Preferably, the initiator 50 is made of a conductive material such as copper or a copper alloy, the coil spring 52 is made of a steel material, the cartridge body 54 is made of a conductive material such as brass, and the tip seat 56 is made of a nonconductive material such as a polyimide. Alternately, as previously set forth, the cartridge body 54 may be insulative, or nonconductive, while the tip seat 56 is insulative.

The initiator 50 according to the present invention is free from fixed connection to the electrode 38 and the cathode 32 (i.e., the cathode side) and the anode 34, the conductive insert 118, and the tip 40 (i.e., the anode side). The term "free from fixed connection" as used herein means that relative movement is possible between the initiator 50 and the cathode side and the anode side in at least one direction, such as axially and/or radially. For example, in the illustrated embodiment, the initiator 50 is free to move axially along a central longitudinal axis X of the torch head 20 within the chamber 160 of the start cartridge 42. More particularly, the initiator 50 is axially movable relative to the electrode 38 and the tip 40 between a first, distal position (FIG. 7A) corresponding to the idle mode of the torch, and a second, proximal position (FIG. 7B) corresponding to the pilot mode of the torch. However, it should be understood that the initiator 50 may be free to move radially relative to the cathode side and the anode side. It is also understood that the initiator 50 may instead be stationary within the torch and either the cathode side, the anode side, or both may be free to move, axially and/or radially, relative to the initiator 50.

As further shown, a plurality of o-rings and associated o-ring grooves are disposed within the torch head 20 to seal the gas flow during operation of the torch. More specifically, an o-ring 180 is disposed between the insulating body 36 and the start cartridge 42 at the distal end 150 of the insulating body 36. Additionally, an o-ring 182 is disposed between the anode 34 and the conductive insert 118 of the shield cup 44 near the distal section 140 of the anode 34. Accordingly, the o-rings 180 and 182 seal the gas flow within the torch head 20 during operation.

Referring to FIGS. 7A and 7B, which correspond with the idle mode of the torch and the pilot mode of the torch, respectively, the operation of the start cartridge 42, and more specifically the initiator 50, to initiate a pilot arc and to operate the torch according to a method of the present invention is shown and described in greater detail. As illustrated, the torch head 20 is connected to a supply of gas and electric power, preferably through the pin fitting 64 as previously described. The application of electric power causes current to flow from the electrode 38, through the initiator 50, and to the tip 40, which are all in direct electrical connection. When the gas supply is activated, a working gas flows through the internal bore 66 of the pin fitting 64 and through the central bores 70 and 84 of the cathode 32 and the electrode 38, respectively. The gas then flows through gas distributing holes 86 of the electrode 38 and through gas distributing holes 128 of the insulating body 36, which causes the gas flow distally into the primary gas chamber 126. The gas then partially flows through the radial gas holes 164 of the start cartridge 42, which causes the initiator 50 to move proximally away from the tip 40, as shown in FIG. 7B in the pilot mode of the torch. Accordingly, the gas pressure is sufficiently high to overcome the bias of the coil spring 52. As the initiator 50 moves proximally away from the tip 40, a pilot arc is drawn between the initiator 50 and the tip 40, and more specifically between the conical interior surface 154 and the beveled distal contact surface 152 which are configured relatively parallel to one another as shown.

Further to the gas flowing partially through the radial gas holes 164 to move the initiator 50, the gas continues to flow distally and into swirl holes 120 as the plasma gas and also into the secondary gas holes 122 as the secondary gas. Accordingly, the plasma gas swirls in the gap between the initiator 50 and the tip 40 and is ionized by the pilot arc formed between the initiator 50 and the tip 40. As shown, the swirl holes 120 are preferably positioned proximally from the area where the conical interior surface 154 of the initiator 50 contacts the beveled distal contact surface 152 of the tip 40, in order to provide a more stable plasma stream. However, the swirl holes 120 may be positioned distally from the area where the initiator 50 contacts the tip 40 and remain within the scope of the present invention. As a result of the gas swirling and pilot arc creation, the ionized gas is blown out the central exit orifice 106 of the tip 40 in the form of a plasma stream. Additionally, the gas that flows through the secondary gas holes 122 flows into the annular recess 124 and then distally along the generally cylindrical distal portion 108 of the tip 40. As a result, the secondary gas forms a cylindrical gas envelope to stabilize the plasma stream that is blown from the central exit orifice 106. The tip 40 with the swirl holes 120 and the secondary gas holes 122 is further described in the co-pending application titled "Tip Gas Distributor," filed Feb. 26, 2002, and commonly assigned with the present application, the contents of which are incorporated herein by reference.

As further shown, the gas that flows into the start cartridge 42 to move the initiator 50 proximally away from the tip 40 is vented through the axial vent holes 175 of the initiator, through axial vent holes 162 in the annular end wall 155 of the cartridge body 54, and proximally through the axial vent holes 130 (shown dashed) in the insulating body 36. The gas then flows through the radial vent holes 134 in the insulating body 36, through the radial vent holes 138 in the anode 34, and out through the opening 142 at the proximal end of the shield cup 44. Accordingly, the torch head 20 according to the present invention incorporates head vent holes (i.e., radial vent holes 134, 138) to vent gas from the torch head 20, which facilitates a more rapid restart of the torch after the gas and electric power are turned off. When the gas and electric power are turned off and the gas is vented as previously described, the force of the coil spring 52 causes the initiator 50 to move distally towards the tip 40 such that the conical interior surface 154 and the beveled distal contact surface 152 come into contact, wherein the plasma arc torch is in the idle mode.

Additional configurations for the start cartridge 42 with the moving initiator 50 may also be employed in accordance with the teachings of copending application titled "Contact Start Plasma Arc Torch and Method of Initiating a Pilot Arc," filed Feb. 26, 2002, which is commonly assigned with the present application and the contents of which are incorporated herein by reference.

Referring now to FIGS. 8 through 12, a start cartridge 200 for use in a high frequency start torch, also referred to as a high frequency start cartridge 200, is shown and is disposed between the electrode 38 and the tip 40 within the torch head 20. The start cartridge 200 defines a generally cylindrical outer wall 202 with a recessed proximal face 204 and a recessed distal face 206. Further, the start cartridge 200 comprises an internal collar 208, wherein a venting chamber 210 is formed between the internal collar 208 and the proximal face 204 as shown. Moreover, the internal collar 208 isolates the venting chamber 210 from the plasma chamber 104 during operation of the plasma arc torch.

The start cartridge 200 further comprises a plurality of vent passages 212 formed in the proximal face 204 that are in communication with the venting chamber 210 and the axial vent holes 130 (shown dashed) formed in the insulating body 36 as previously described. As further shown, the distal shoulder 156 of the electrode 38 abuts the proximal face 204 of the start cartridge 200, while a distal shaft 214 of the electrode 38 is slidably engaged within the internal collar 208. Additionally, the tip 40 abuts the recessed distal face 206 as shown when the components of the torch head 20 are secured to the torch head 20 by the shield cup 44.

Figure 11:
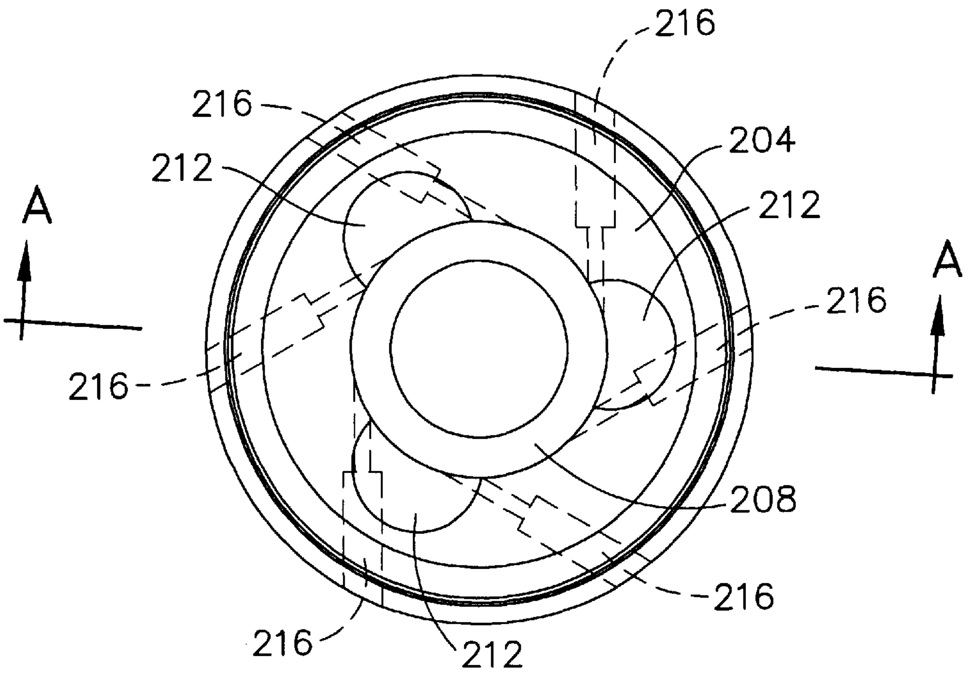
FIG. 11 is a plan view of the high frequency start cartridge in accordance with the principles of the present invention.
Figure 12:
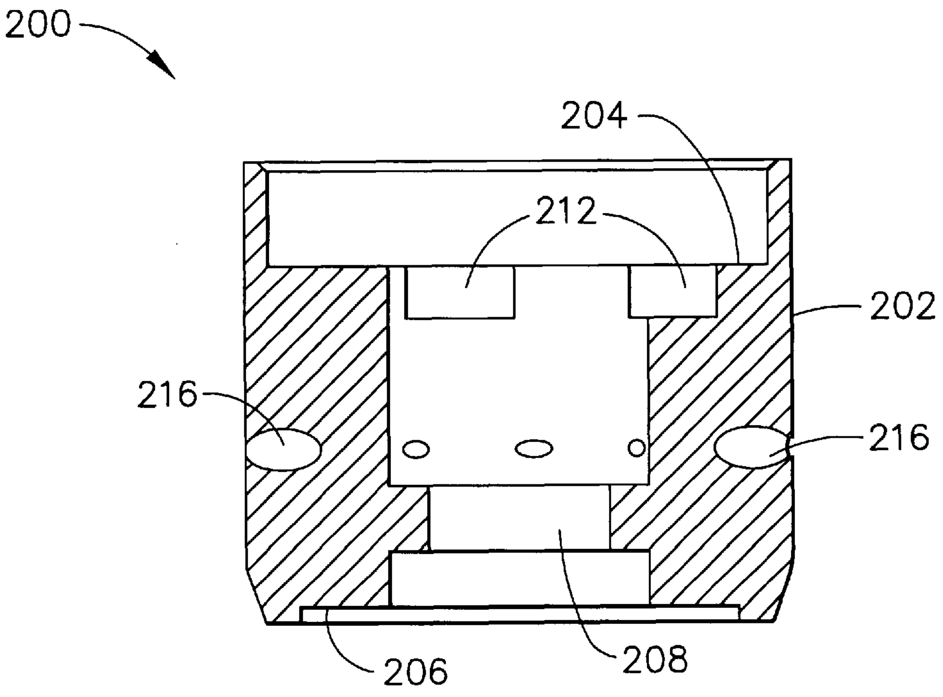
FIG. 12 is a cross-sectional view, taken along line A—A of FIG. 11, of the high frequency start cartridge in accordance with the principles of the present invention.

The start cartridge 200 also comprises a plurality of vent holes 216, which are preferably offset from a center of the start cartridge 200 as best illustrated in FIG. 11. As shown, a total of six (6) vent holes 216 are provided, however, one or more vent holes 216 may be provided according to specific operational requirements. The vent holes 216 also define outer vent holes 216*a* and inner vent holes 216*b*, wherein the inner vent holes 216*b* are generally smaller in diameter than the outer vent holes 216*a* such that a pressure drop is created through the vent holes 216 and the velocity of the gas is thereby increased for purposes as set forth below. Further, the vent passages 212 preferably define a partial cylindrical configuration that are in fluid communication with the venting chamber 210 extending through the start cartridge 200. Additionally, a total of three (3) vent passages 212 are employed in one form of the present invention, however, one or more vent passages 212 may be used according to specific operational requirements.

In operation, a portion of the working gas that flows distally through the primary gas chamber 126 flows into the vent holes 216 to create a swirling flow of gas within the venting chamber 210. The gas then flows from the venting chamber 210 through the vent passages 212 and through the axial vent holes 130 to vent through the torch head as previously described. Accordingly, the vent holes 216 provide a passage for gas to cool the electrode 38 during operation of the plasma arc torch. Additionally, as the gas flows from the outer vent holes 216*a* to the inner vent holes 216*b*, the velocity increases, thereby providing additional cooling for the electrode 38.

Preferably, the start cartridge 200 is a molded, single-piece component and is nonconductive or insulative. Accordingly, the preferred material for the start cartridge 200 is Deirin®, or other similar nonconductive material commonly known in the art such as Nylon or Vespel®. Additionally, the vent holes 216*a* and 216*b* may be secondarily formed through the start cartridge 200 using methods such as high-precision machining, among others commonly known in the art.

Figure 13A:
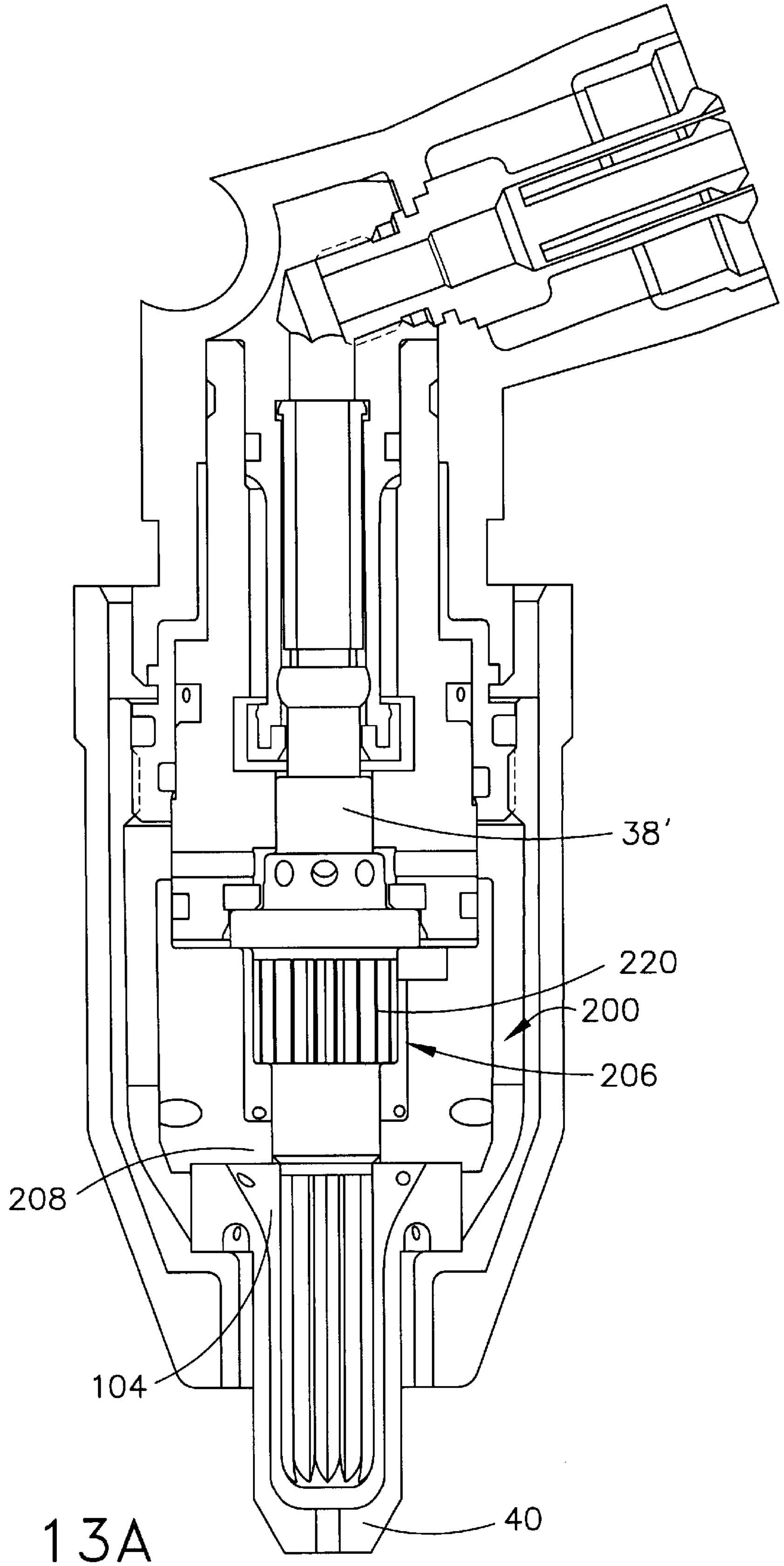
FIG. 13A is a cross-sectional view of a torch head comprising and electrode defining axial grooves and a second embodiment of a start cartridge for a high frequency start mode and constructed in accordance with the principles of the present invention.
Figure 13B:
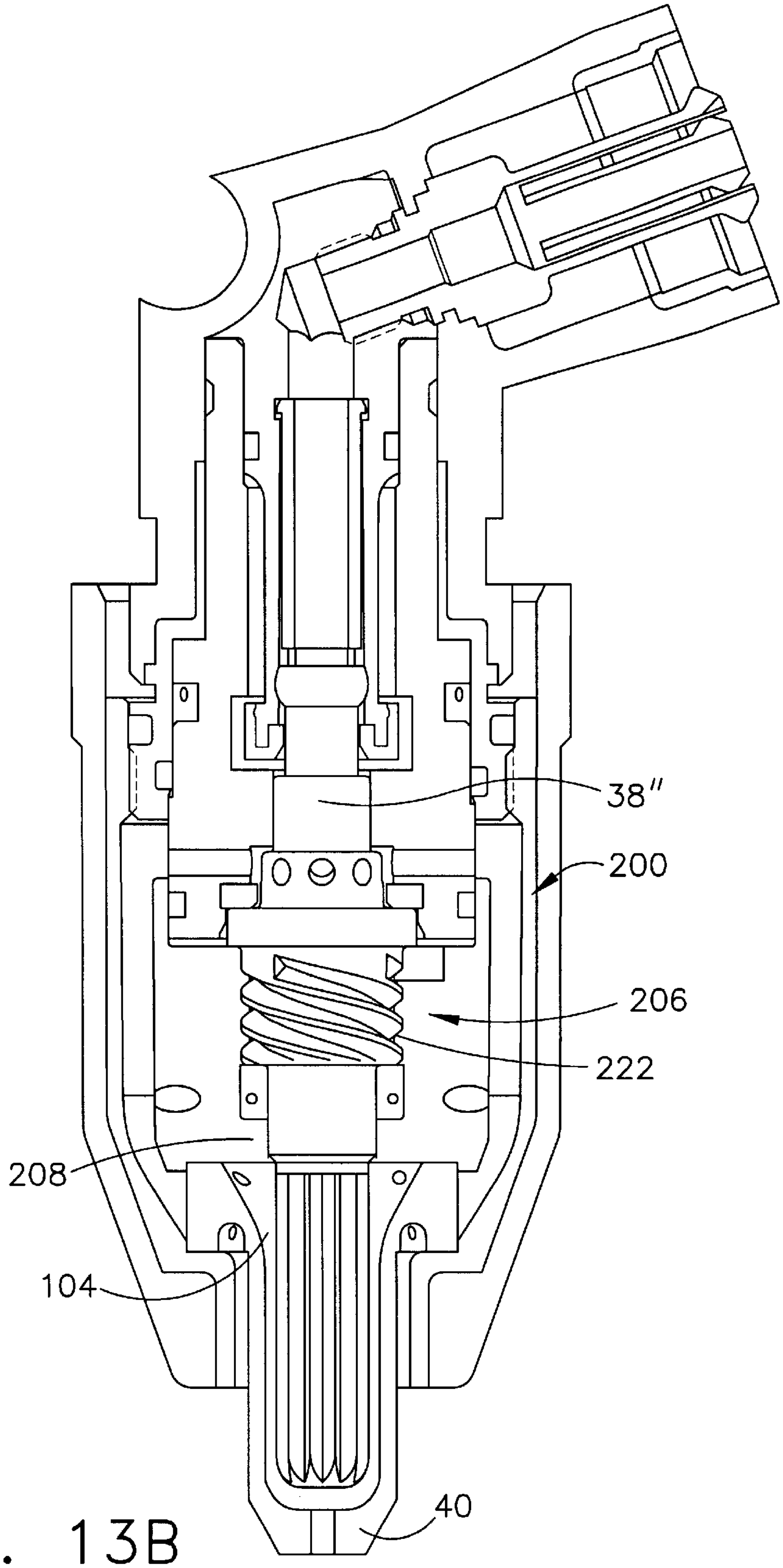
FIG. 13B is a cross-sectional view of a torch head comprising an electrode defining spiral grooves and the second embodiment of a start cartridge for a high frequency start mode in accordance with the principles of the present invention.

Referring now to FIGS. 13A and 13B, the central portion 206 of the electrode 38 may be configured to provide additional cooling, as shown by electrodes 38' (FIG. 13A) and 38" (FIG. 13B), wherein the central portion 206 may define axial grooves 220 (FIG. 13A) or spiral grooves 222 (FIG. 13B) as shown. Accordingly, the grooves 220 and 222 direct and control the gas being vented through the start cartridge 200 along the central portion 206 of the electrode 38 to provide additional cooling as necessary. Additionally, the internal collar 208 may be positioned further distally within the start cartridge 200 as shown to minimize any upward flow of the plasma gas being swirled into the plasma chamber 104 by the tip 40.

Contact Start Torch Operable under High Frequency

As a result of previously described embodiments wherein the start cartridge having an initiator is operable under both low voltage and high frequency, the inventors have further developed torch embodiments wherein a conventional contact start torch is operable under high frequency. Generally, an additional amount of dielectric standoff is provided between a cathode body and an anode body within the torch head such that the high frequency, or high voltage, does not penetrate or arc through the insulating body and cause the torch to malfunction. Further, any additional moving elements, e.g., electrode, tip, and/or moving third element, as described in greater detail below, operate substantially the same as under low voltage.

Figure 14:
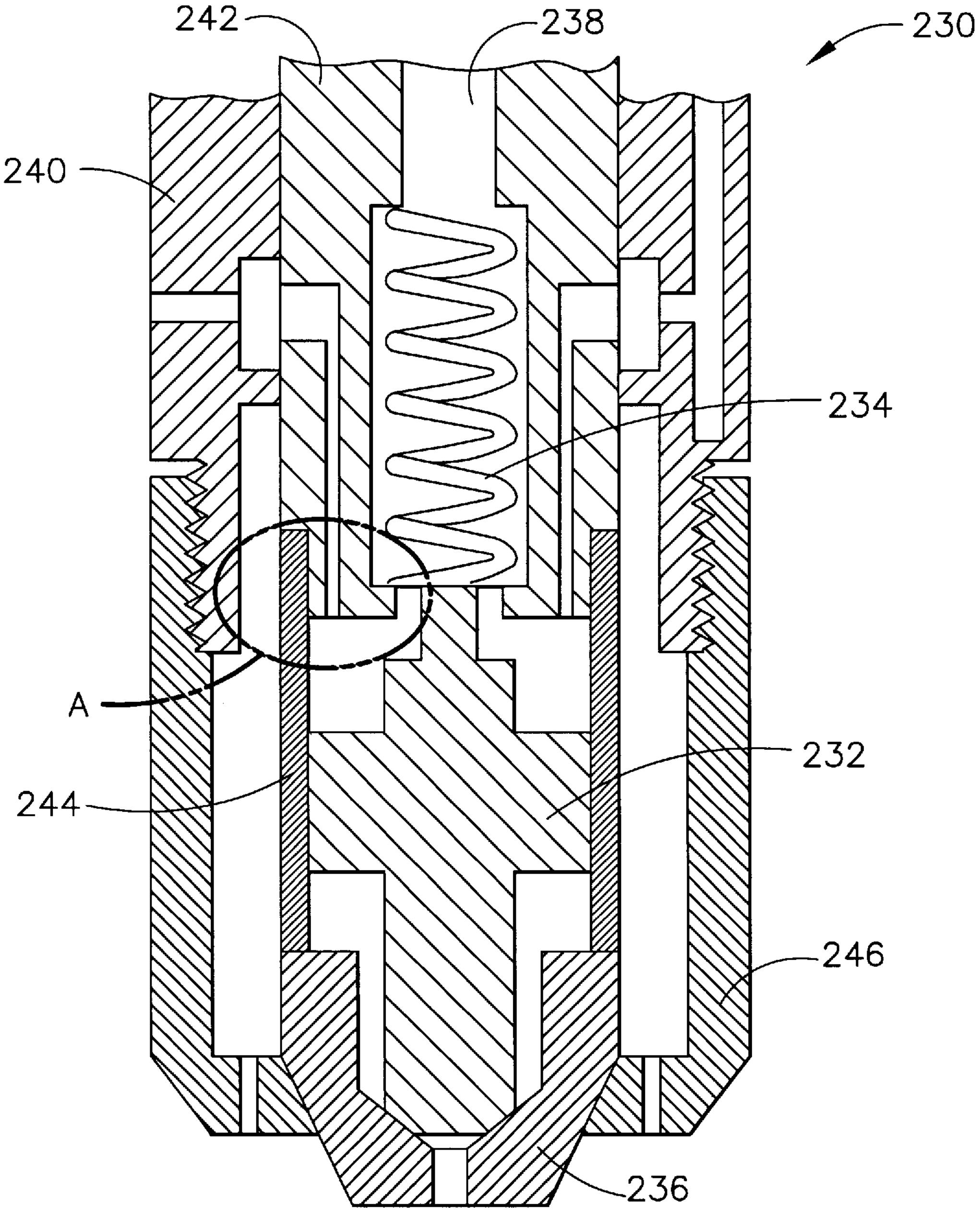
FIG. 14 (PRIOR ART)
FIG. 14 is a cross-sectional view of a prior art contact start plasma arc torch.

Referring to FIG. 14, a conventional contact start torch 230 is illustrated, wherein an electrode 232 is movable against a spring member 234 to initiate a pilot arc between the electrode 232 and a tip 236. As shown, the contact start torch 230 comprises a cathode body 238, an anode body 240, and insulating bodies 242 and 244 disposed between the cathode body 238 and the anode body 240, wherein the cathode body 238 further includes the electrode 232 as the negative side of the power supply, and the anode body 240 further includes the tip 236 and a cap 246 as the positive side of the power supply. However, if a high frequency were to be supplied to the contact start torch 230, the high voltage would likely arc across the cathode body 238 and the anode body 240, most likely in the area designated by "A," which would probably cause the contact start torch 230 to malfunction.

Figure 15:
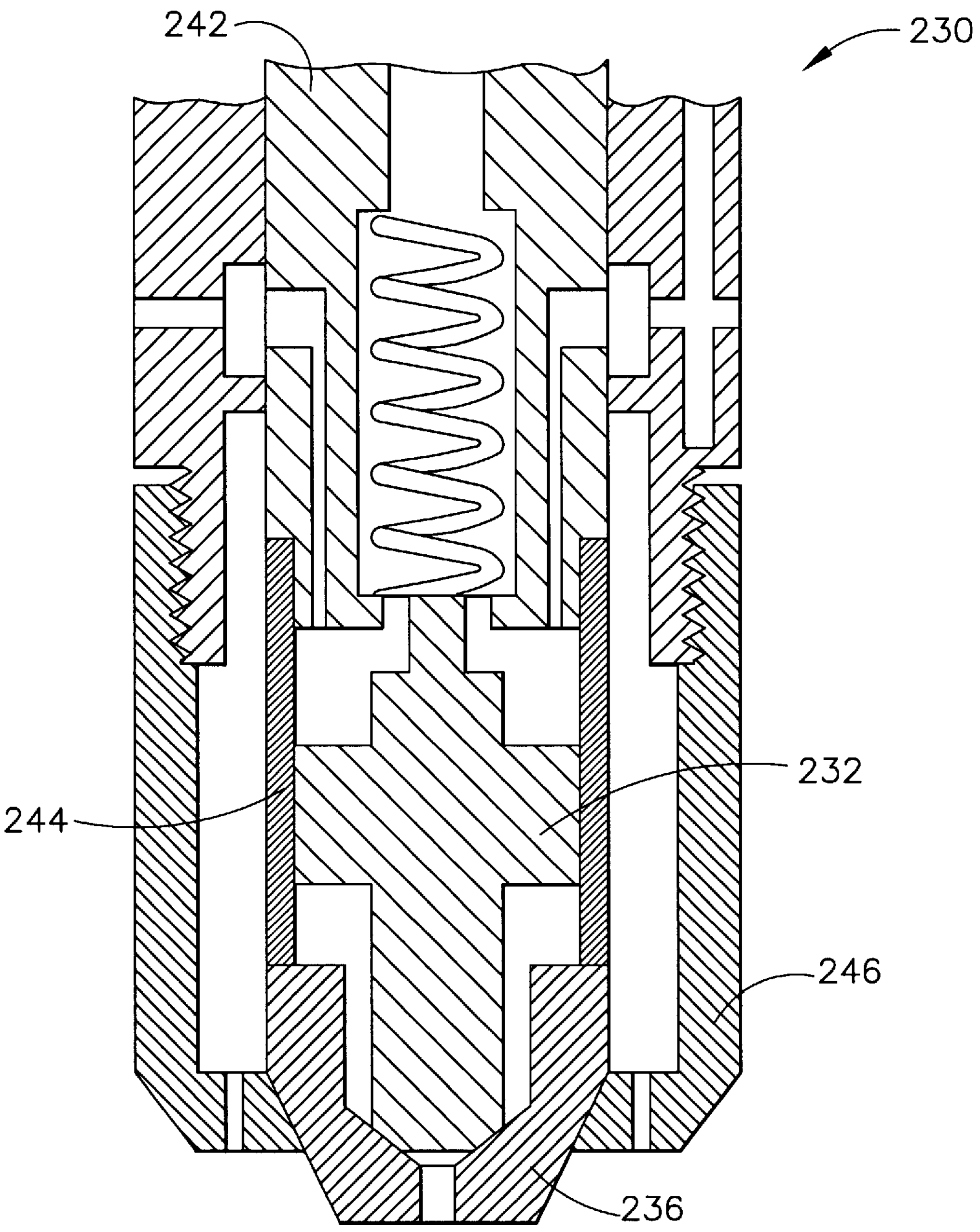
FIG. 15 is a cross-sectional view of a contact start plasma arc torch modified with additional dielectric standoff and constructed in accordance with the principles of the present invention.

Referring now to FIG. 15, additional dielectric standoff is provided within the conventional contact start torch 230, wherein the insulating bodies 242 and 244 are substantially thicker in cross section so as to prevent such arcing and the likelihood of torch malfunction. Accordingly, the size of the tip 236 and the cap 246 are also increased to accommodate the additional dielectric standoff, in the form of thicker insulating bodies 242 and 244, as shown.

High Frequency Torch Operable under Low Voltage

As a result of previously described embodiments wherein the start cartridge having an initiator is operable under both low voltage and high frequency, the inventors have further developed torch embodiments wherein a conventional high frequency start torch is operable under low voltage. Generally, the high frequency start torch is retrofitted with a moving element such as a moving electrode, a moving tip, and/or a moving third element as described in greater detail below. Accordingly, the high frequency plasma arc torch maintains a configuration with a high degree of dielectric standoff, and the moving element is used to draw a pilot arc for ignition of the high frequency plasma arc torch under low voltage.

Figure 16:
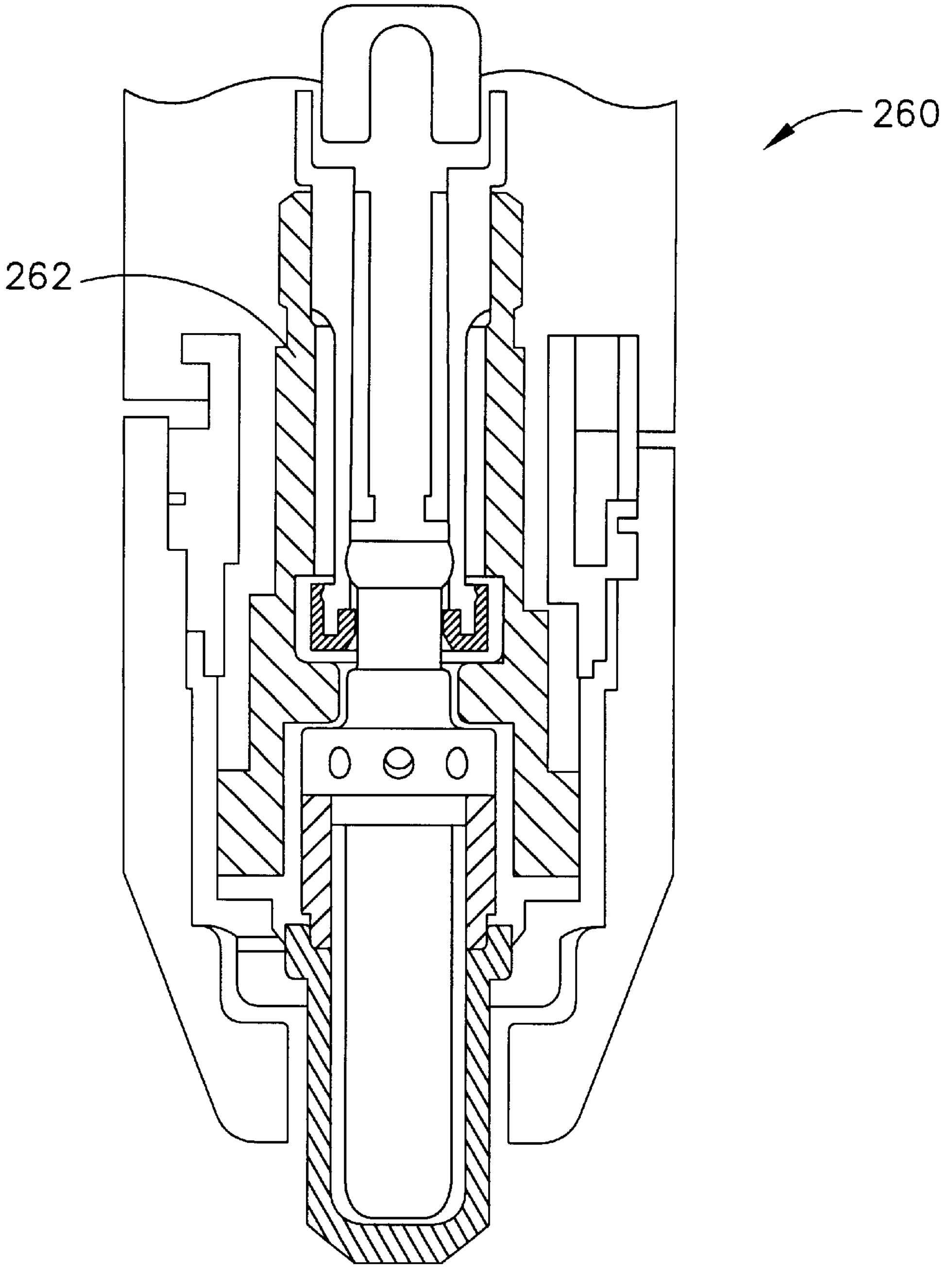
FIG. 16 (PRIOR ART)
FIG. 16 is a cross-sectional view of a prior art high frequency start plasma arc torch.

Referring to FIG. 16, a conventional high frequency start torch 260 is illustrated, which is shown and described in co-owned U.S. Pat. No. 6,163,008, the contents of which are incorporated herein by reference. As shown, the high frequency torch 260 comprises a dielectric standoff, i.e. insulating body 262, sufficient to withstand a high frequency start, however, none of the components are movable and thus the torch as shown cannot operate under low voltage.

Figure 17:
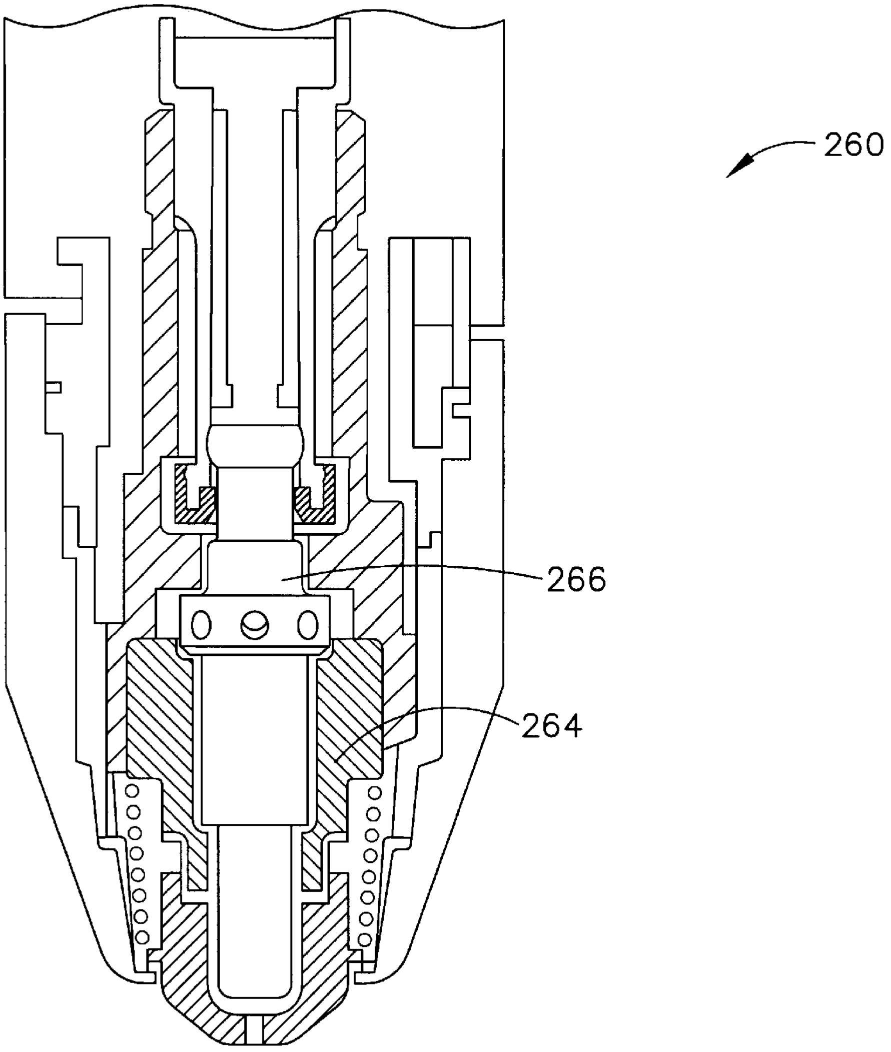
FIG. 17 is a cross-sectional view of a high frequency plasma arc torch retrofitted with a third element and constructed in accordance with the principles of the present invention.

Referring now to FIG. 17, the high frequency torch 260 is illustrated with a movable element 264, which is shown biased into contact with an electrode 266 and movable against the bias towards a tip 268 such that a pilot arc is drawn between the electrode 266 and a tip 268. It should be understood by those skilled in the art that the movable element 264 may comprise a movable electrode, a movable tip, and/or a movable third element, such as those described in U.S. Pat. No. 5,994,663 (moving third element), U.S. Pat. No. 4,902,871 (moving electrode), and U.S. Pat. No. 5,897,795 (moving nozzle), among others commonly known in the art. Accordingly, the high frequency torch 260 is retrofitted with a movable element 264 such that the high frequency torch 260 is operable under low voltage.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A plasma arc torch comprising:

an electrode;

a tip; and a start cartridge disposed between the electrode and the tip, the start cartridge comprising an initiator in electrical contact with the electrode and resiliently biased into contact with the tip, wherein when the plasma arc torch is in a contact start mode, the initiator is movable to separate from the tip and establish a pilot arc between the initiator and the tip, and when the plasma arc torch is in a high frequency start mode, the start cartridge spaces the tip from the electrode such that a pilot arc is established between the electrode and the tip.

2. The plasma arc torch according to claim 1, wherein the start cartridge further comprises:

a cartridge assembly;

a biasing member disposed within the cartridge assembly; and the initiator disposed adjacent the biasing member and within the cartridge assembly, wherein the biasing member biases the initiator into contact with the tip.

3. The plasma arc torch according to claim 2, wherein the cartridge assembly further comprises a cartridge body and a tip seat secured to a distal portion of the cartridge body.

4. The plasma arc torch according to claim 2, wherein the biasing member is a coil spring.

5. A plasma arc torch comprising:

an electrode;

a tip; and at least one of a contact start cartridge for a contact start mode and a high frequency start cartridge for a high frequency start mode, the start cartridges being disposed between the electrode and the tip, and the contact start cartridge comprising an initiator in electrical contact with the electrode and resiliently biased into contact with the tip, wherein when the plasma arc torch is in a contact start mode, the initiator is movable to separate from the tip and establish a pilot arc between the initiator and the tip, and when the plasma arc torch is in a high frequency start mode, the high frequency start cartridge spaces the tip from the electrode such that a pilot arc is established between the electrode and the tip.

6. The plasma arc torch according to claim 5, wherein the high frequency start cartridge further comprises:

a plurality of vent holes that provide gas flow to cool the electrode.

7. The plasma arc torch according to claim 6, wherein the vent holes further comprise outer vent holes and inner vent holes such that a velocity of the gas is increased as the gas flows from the outer vent holes to the inner vent holes.

8. The plasma arc torch according to claim 6, wherein the vent holes are offset from a center of the high frequency start cartridge.

9. The plasma arc torch according to claim 6, wherein the high frequency start cartridge further comprises a plurality of vent passages in communication with the vent holes to vent the gas from within the start cartridge.

10. The plasma arc torch according to claim 5, wherein the high frequency start cartridge further comprises an internal collar to isolate a venting chamber from a plasma chamber.

11. The plasma arc torch according to claim 5, wherein the high frequency start cartridge further comprises:

a cartridge body defining a distal end; and a tip seat secured to the distal end of the cartridge body, wherein the cartridge body is in electrical contact with the electrode and the tip seat insulates the cartridge body from the tip.

12. The plasma arc torch according to claim 5, wherein the high frequency start cartridge further comprises:

a cartridge body; and a tip seat secured to a distal end of the cartridge body, wherein the tip seat is in electrical contact with the tip and the cartridge body insulates the tip seat from the electrode.

13. A plasma arc torch comprising:

an electrode;

a tip; and a start cartridge disposed between the electrode and the tip, the start cartridge comprising a plurality of vent holes that provide gas flow to cool the electrode, wherein the start cartridge spaces the tip from the electrode such that a pilot arc is established between the electrode and the tip when the plasma arc torch is in a high frequency start mode.

14. The plasma arc torch according to claim 13, wherein the vent holes further comprise outer vent holes and inner vent holes such that a velocity of the gas is increased as the gas flows from the outer vent holes to the inner vent holes.

15. The plasma arc torch according to claim 13, wherein the vent holes are offset from a center of the start cartridge.

16. The plasma arc torch according to claim 13, wherein the start cartridge further comprises a plurality of vent passages in communication with the vent holes to vent the gas from within the start cartridge.

17. The plasma arc torch according to claim 13, wherein the start cartridge further comprises an internal collar to isolate a venting chamber from a plasma chamber.

18. The plasma arc torch according to claim 13, wherein the start cartridge further comprises:

a cartridge body; and a tip seat secured to a distal end of the cartridge body, wherein the cartridge body is in electrical contact with the electrode and the tip seat insulates the cartridge body from the tip.

19. The plasma arc torch according to claim 13, wherein the start cartridge further comprises:

a cartridge body; and a tip seat secured to a distal end of the cartridge body, wherein the tip seat is in electrical contact with the tip and the cartridge body insulates the tip seat from the electrode.

20. A start cartridge for use in a high frequency start plasma arc torch, the start cartridge providing separation and electrical isolation between an electrode and a tip in the plasma arc torch, the start cartridge further comprising a plurality of vent holes that provide gas flow to cool the electrode.

21. The start cartridge according to claim 20, wherein the vent holes further comprise outer vent holes and inner vent holes such that a velocity of the gas is increased as the gas flows from the outer vent holes to the inner vent holes.

22. The start cartridge according to claim 20, wherein the vent holes are offset from a center of the start cartridge.

23. The start cartridge according to claim 20, wherein the start cartridge further comprises a plurality of vent passages in communication with the vent holes to vent the gas from within the start cartridge.

24. The start cartridge according to claim 20, wherein the start cartridge further comprises an internal collar to isolate a venting chamber from a plasma chamber within the plasma arc torch.

25. The start cartridge according to claim 20 further comprising:

a cartridge body defining a distal end; and a tip seat secured to the distal end of the cartridge body, wherein the cartridge body is in electrical contact with the electrode and the tip seat insulates the cartridge body from the tip.

26. The start cartridge according to claim 20 further comprising:

a cartridge body; and a tip seat secured to a distal end of the cartridge body, wherein the tip seat is in electrical contact with the tip and the cartridge body insulates the tip seat from the electrode.

27. A start cartridge for use in a high frequency start plasma arc torch, the start cartridge providing separation and electrical isolation between an electrode and a tip in the plasma arc torch, comprising:

a plurality of vent holes defining outer vent holes and inner vent holes; and an internal collar, wherein the vent holes provide gas flow to cool the electrode, and a velocity of the gas is increased as the gas flows from the outer vent holes to the inner vent holes and the internal collar isolates a venting chamber from a plasma chamber within the plasma arc torch.

28. A plasma arc torch comprising:

an electrode;

a tip; and a start cartridge disposed between the electrode and the tip, the start cartridge comprising:

a cartridge body;

a tip seat secured to a distal end of the cartridge body;

a biasing member disposed within the cartridge body; and an initiator in electrical contact with the electrode and biased into contact with the tip by the biasing member, wherein when the plasma arc torch is in a contact start mode, the initiator is movable against the resilient bias to separate from the tip and establish a pilot arc between the initiator and the tip, and when the plasma arc torch is in a high frequency start mode, the start cartridge spaces the tip from the electrode such that a pilot arc is established between the electrode and the tip.

29. The plasma arc torch according to claim 28, wherein the biasing member is a coil spring.

30. A plasma arc torch comprising:

an electrode;

a tip; and at least one of a contact start cartridge for a contact start mode and a high frequency start cartridge for a high frequency start mode, the start cartridges being disposed between the electrode and the tip, the contact start cartridge comprising:

a cartridge body;

a tip seat secured to a distal end of the cartridge body;

a biasing member disposed within the cartridge body; and an initiator in electrical contact with the electrode and biased into contact with the tip by the biasing member, wherein when the plasma arc torch is in a contact start mode, the initiator is movable against the resilient bias to separate from the tip and establish a pilot arc between the initiator and the tip, and when the plasma arc torch is in a high frequency start mode, the start cartridge spaces the tip from the electrode such that a pilot arc is established between the electrode and the tip.

31. The plasma arc torch according to claim 30, wherein the high frequency start cartridge further comprises:

a plurality of vent holes that provide gas flow to cool the electrode.

32. The plasma arc torch according to claim 31, wherein the vent holes further comprise outer vent holes and inner vent holes such that a velocity of the gas is increased as the gas flows from the outer vent holes to the inner vent holes.

33. The plasma arc torch according to claim 31, wherein the vent holes are offset from a center of the high frequency start cartridge.

34. The plasma arc torch according to claim 31, wherein the high frequency start cartridge further comprises a plurality of vent passages in communication with the vent holes to vent the gas from within the start cartridge.

35. The plasma arc torch according to claim 30, wherein the high frequency start cartridge further comprises an internal collar to isolate a venting chamber from a plasma chamber.

36. The plasma arc torch according to claim 30, wherein the high frequency start cartridge further comprises:

a cartridge body; and a tip seat secured to a distal end of the cartridge body, wherein the cartridge body is in electrical contact with the electrode and the tip seat insulates the cartridge body from the tip.

37. The plasma arc torch according to claim 30, wherein the high frequency start cartridge further comprises:

a cartridge body; and a tip seat secured to a distal end of the cartridge body, wherein the tip seat is in electrical contact with the tip and the cartridge body insulates the tip seat from the electrode.

38. A plasma arc torch comprising:

an electrode;

a tip; and at least one of a contact start cartridge for a contact start mode and a high frequency start cartridge for a high frequency start mode, the start cartridges being disposed between the electrode and the tip, the contact start cartridge comprising:

a cartridge body;

a tip seat secured to a distal end of the cartridge body;

a biasing member disposed within the cartridge body; and an initiator in electrical contact with the electrode and biased into contact with the tip by the biasing member; and the high frequency start cartridge comprising a plurality of vent holes defining outer vent holes and inner vent holes, an internal collar, and vent passages such that the vent holes and vent passages provide gas flow to cool the electrode, and a velocity of the gas is increased as the gas flows from the outer vent holes to the inner vent holes, and the internal collar isolates a venting chamber from a plasma chamber within the plasma arc torch, wherein when the plasma arc torch is in a contact start mode, the initiator is movable against the resilient bias to separate from the tip and establish a pilot arc between the initiator and the tip, and when the plasma arc torch is in a high frequency start mode, the high frequency start cartridge spaces the tip from the electrode such that a pilot arc is established between the electrode and the tip.

39. A contact start torch modified for operation with a high frequency power supply comprising:

a torch head;

an electrode electrically connected to a cathode within the torch head;

a tip electrically connected to an anode within the torch head; and a dielectric standoff, wherein the dielectric standoff is sized such that the contact start torch is operable under high frequency.

40. The contact start torch according to claim 39, wherein the electrode is translatable relative to the tip to initiate a pilot arc between the electrode and the tip.

41. The contact start torch according to claim 39, wherein the tip is translatable relative to the electrode to initiate a pilot arc between the electrode and the tip.

42. The contact start torch according to claim 39, wherein the electrode and the tip are translatable relative to each other to initiate a pilot arc between the electrode and the tip.

43. A contact start torch modified for operation with a high frequency power supply comprising:

a torch head;

an electrode electrically connected to a cathode within the torch head;

a tip electrically connected to an anode within the torch head a movable element disposed between the electrode and the tip that moves to create a pilot arc between the electrode and the tip; and a dielectric standoff disposed between the cathode and the anode, wherein the dielectric standoff is sized such that the contact start torch is operable under high frequency.

44. A high frequency plasma arc torch modified for operation with a low voltage power supply comprising:

a torch head;

an electrode electrically connected to a cathode within the torch head; and a tip electrically connected to an anode within the torch head;

wherein either one of both of the electrode and the tip are movable and the plasma arc torch operates under low voltage.

45. A high frequency plasma arc torch modified for operation with a low voltage power supply comprising:

a torch head;

an electrode electrically connected to a cathode within the torch head;

a movable third element disposed between the electrode and the tip; and a tip electrically connected to an anode within the torch head;

wherein the movable third element is movable between the electrode and the tip to form a pilot arc, and the plasma arc torch operates under low voltage.

46. A method of initiating a pilot arc in a plasma arc torch, the method comprising the steps of:

disposing a start cartridge comprising an initiator between an electrode and a tip;

biasing the initiator into contact with the tip;

providing a source of gas and electric power; and directing at least a portion of the gas to overcome the bias to separate the initiator from the tip, wherein the pilot arc is drawn between the initiator and the tip as the bias is overcome when the plasma arc torch is in a contact start mode, and the pilot arc is drawn between the electrode and the tip as the start cartridge spaces the electrode from the tip when the plasma arc torch is in a high frequency start mode.

47. The method of claim 46 further comprising the step of venting at least a portion of the gas used to overcome the bias through the start cartridge when the plasma arc torch is in the contact start mode.

48. The method according to claim 47 further comprising the step of venting the gas from the start cartridge through head vent holes in a torch head.

49. A method of operating a plasma arc torch in one of a contact start mode and a high frequency start mode, the method comprising the steps of:

disposing a contact start cartridge comprising an initiator between an electrode and a tip when the plasma arc torch is in the contact start mode;

biasing the initiator into contact with the tip;

providing a source of gas and electric power; and directing at least a portion of the gas to overcome the bias to separate the initiator from the tip, wherein the pilot arc is drawn between the initiator and the tip as the bias is overcome when the plasma arc torch is in the contact start mode, and disposing a high frequency start cartridge between an electrode and a tip when the plasma arc torch is in the high frequency start mode, wherein the pilot arc is drawn between the electrode and the tip as the start cartridge spaces the electrode from the tip in the high frequency start mode.

50. The method according to claim 49 further comprising the step of venting at least a portion of the gas used to overcome the bias through the contact start cartridge when the plasma arc torch is in the contact start mode.

51. The method according to claim 50 further comprising the step of venting the gas from the contact start cartridge through head vent holes in a torch head.

52. The method according to claim 49 further comprising the step of venting a portion of the gas through the start cartridge during operation to cool an electrode disposed within the plasma arc torch.

53. A method of operating a plasma arc torch in a high frequency mode, the method comprising the steps of:

disposing a start cartridge between an electrode and a tip;

providing a source of gas and electric power; and venting a portion of the gas through the start cartridge during operation to cool an electrode disposed within the plasma arc torch, wherein a pilot arc is drawn between the electrode and the tip as the start cartridge spaces the electrode from the tip in the high frequency start mode.

54. A method of operating a contact start plasma arc torch modified to operate under high frequency, the method comprising the steps of:

providing a sufficient dielectric standoff between a cathode body and an anode body within the plasma arc torch sufficient to operate under high frequency; and providing a source of gas and electric power at a high frequency, wherein the contact start plasma arc torch is operable in a high frequency start mode with the dielectric standoff.

55. A method of operating a high frequency start plasma arc torch modified to operate under low voltage, the method comprising the steps of:

providing a movable element to the high frequency start plasma arc torch;

providing a source of gas and electric power at low voltage; and moving the movable element such that a pilot arc is generated, wherein the high frequency start plasma arc torch is operable under low voltage.

56. The method according to claim 55, wherein the movable element is an electrode.

57. The method according to claim 55, wherein the movable element is a tip.

58. The method according to claim 55, wherein the movable element is a movable third element.

* * * * *